(12) United States Patent
Atungsiri

(10) Patent No.: US 12,199,750 B2
(45) Date of Patent: Jan. 14, 2025

(54) MULTIPLE MODULATION SCHEME SIGNALLING IN A SINGLE RESOURCE ALLOCATION

(71) Applicant: Sony Group Corporation, Tokyo (JP)

(72) Inventor: Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 340 days.

(21) Appl. No.: 17/796,683

(22) PCT Filed: Mar. 1, 2021

(86) PCT No.: PCT/EP2021/055079
§ 371 (c)(1),
(2) Date: Aug. 1, 2022

(87) PCT Pub. No.: WO2021/190870
PCT Pub. Date: Sep. 30, 2021

(65) Prior Publication Data
US 2023/0056886 A1    Feb. 23, 2023

(30) Foreign Application Priority Data
Mar. 26, 2020    (EP) ..................... 20166040

(51) Int. Cl.
*H04L 1/00*        (2006.01)
*H04L 27/00*      (2006.01)
(Continued)

(52) U.S. Cl.
CPC ........ *H04L 1/0003* (2013.01); *H04L 27/0008* (2013.01); *H04W 72/0446* (2013.01); *H04W 72/0453* (2013.01)

(58) Field of Classification Search
CPC . H04L 1/0003; H04L 27/0008; H04L 1/0009; H04L 5/0044; H04L 5/0094;
(Continued)

(56) References Cited

U.S. PATENT DOCUMENTS

2007/0097915 A1    5/2007  Papasakellariou
2012/0269287 A1   10/2012  Papasakellariou
(Continued)

FOREIGN PATENT DOCUMENTS

CN    109906571 A    6/2019
CN    112204896 A    1/2021
(Continued)

OTHER PUBLICATIONS

International Search Report and Written Opinion mailed on Jun. 9, 2021, received for PCT Application PCT/EP2021/055079, filed on Mar. 1, 2021, 13 pages.
(Continued)

*Primary Examiner* — Thai Nguyen
(74) *Attorney, Agent, or Firm* — XSENSUS LLP

(57) ABSTRACT

A infrastructure equipment is provided. The infrastructure equipment forms part of a wireless communications network configured to receive data from a communications device via a communications channel between the infrastructure equipment and the communications device. The infrastructure equipment comprises transceiver circuitry to transmit signals to and to receive signals from the communications device, and controller circuitry. The controller circuitry is configured in combination with the transceiver circuitry to receive first control signalling from the communications device, the first control signalling requesting a resource allocation within which the communications device is to transmit data to the infrastructure equipment, to determine a resource allocation of the communications channel for the communications device to transmit the data to the infrastructure equipment, and to transmit second control signalling to the communications device, the second control signalling comprising an indication of the resource allocation.

18 Claims, 16 Drawing Sheets

(51) Int. Cl.
*H04W 72/0446* (2023.01)
*H04W 72/0453* (2023.01)

(58) Field of Classification Search
CPC ............ H04L 5/0005; H04W 72/0446; H04W 72/0453; H04W 72/542; H04W 72/20; H04W 72/1263
See application file for complete search history.

(56) References Cited

U.S. PATENT DOCUMENTS

| | | |
|---|---|---|
| 2014/0126526 A1 | 5/2014 | Papasakellariou |
| 2016/0254894 A1* | 9/2016 | Tomeba ................ H04B 7/0456 370/329 |
| 2017/0034845 A1* | 2/2017 | Liu ................... H04W 74/0833 |
| 2019/0260623 A1 | 8/2019 | Li et al. |
| 2019/0373486 A1 | 12/2019 | Bai et al. |

FOREIGN PATENT DOCUMENTS

| | | | |
|---|---|---|---|
| EP | 3531591 A1 | 8/2019 | |
| WO | WO-2013096555 A1 * | 6/2013 | ........... H04L 5/0053 |
| WO | 2018/082056 A1 | 5/2018 | |
| WO | 2019/231561 A1 | 12/2019 | |
| WO | 2021/094119 A1 | 5/2021 | |

OTHER PUBLICATIONS

3GPP, "NR; NR and NG-RAN Overall Description; Stage 2 (Release 15)", 3GPP TS 38.300 V15.2.0, Jun. 2018, pp. 1-87.
Holma et al., "LTE for UMTS OFDMA and SC-FDMA Based Radio Access", John Wiley & Sons, 2009, pp. 25-27.

* cited by examiner

MULTIPLE MODULATION SCHEME SIGNALLING IN A SINGLE RESOURCE ALLOCATION

CROSS-REFERENCE TO RELATED APPLICATIONS

The present application is based on PCT filing PCT/EP2021/055079, filed Mar. 1, 2021, which claims priority to EP 20166040.4, filed Mar. 26, 2020, the entire contents of each are incorporated herein by reference.

BACKGROUND

Field of Disclosure

The present disclosure relates to communications devices, infrastructure equipment and methods for the transmission and reception of data in a wireless communications network and for the dynamic and adaptive generation of waveforms for the transmission of that data in accordance with channel conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

The increasing use of different types of communications devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

At least some embodiments of the present technique can provide an infrastructure equipment. The infrastructure equipment forms part of a wireless communications network configured to receive data from a communications device via a communications channel between the infrastructure equipment and the communications device. The infrastructure equipment comprises transceiver circuitry to transmit signals to and to receive signals from the communications device, and controller circuitry. The controller circuitry is configured in combination with the transceiver circuitry to receive first control signalling from the communications device, the first control signalling requesting a resource allocation within which the communications device is to transmit data to the infrastructure equipment, to determine a resource allocation of the communications channel for the communications device to transmit the data to the infrastructure equipment, and to transmit second control signalling to the communications device, the second control signalling comprising an indication of the resource allocation. The second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Other embodiments of the present technique can provide an infrastructure equipment. The infrastructure equipment forms part of a wireless communications network configured to transmit data to a communications device via a communications channel between the infrastructure equipment and the communications device. The infrastructure equipment comprises transceiver circuitry to transmit signals to and to receive signals from the communications device, and controller circuitry. The controller circuitry is configured in combination with the transceiver circuitry to determine that the infrastructure equipment has data to transmit to the communications device, to determine a resource allocation of the communications channel for the infrastructure equipment to transmit the data to the communications device, and to transmit first control signalling to the communications device, the first control signalling comprising an indication of the resource allocation. The first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

Further embodiments of the present technique can provide a communications device. The communications device forms part of a wireless communications network configured to transmit data to an infrastructure equipment via a communications channel between the communications device and the infrastructure equipment. The communications device comprises transceiver circuitry to transmit signals to and to receive signals from the infrastructure equipment, and controller circuitry. The controller circuitry is configured in combination with the transceiver circuitry to determine that the communications device has data to transmit to the infrastructure equipment, to transmit first control signalling to the infrastructure equipment, the first control signalling requesting a resource allocation within which the communications device is to transmit the data to the infrastructure equipment, and to receive second control signalling from the infrastructure equipment, the second control signalling comprising an indication of a resource allocation of the communications channel for the communications device to transmit the data to the infrastructure equipment. The second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Yet further embodiments of the present technique can provide a communications device. The communications device forms part of a wireless communications network configured to transmit data to an infrastructure equipment via a communications channel between the communications device and the infrastructure equipment. The communications device comprises transceiver circuitry to transmit signals to and to receive signals from the infrastructure equipment, and controller circuitry. The controller circuitry is configured in combination with the transceiver circuitry to receive first control signalling from the infrastructure equipment, the first control signalling comprising an indication of a resource allocation of the communications channel in which the communications device is to receive data from the infrastructure equipment. The first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
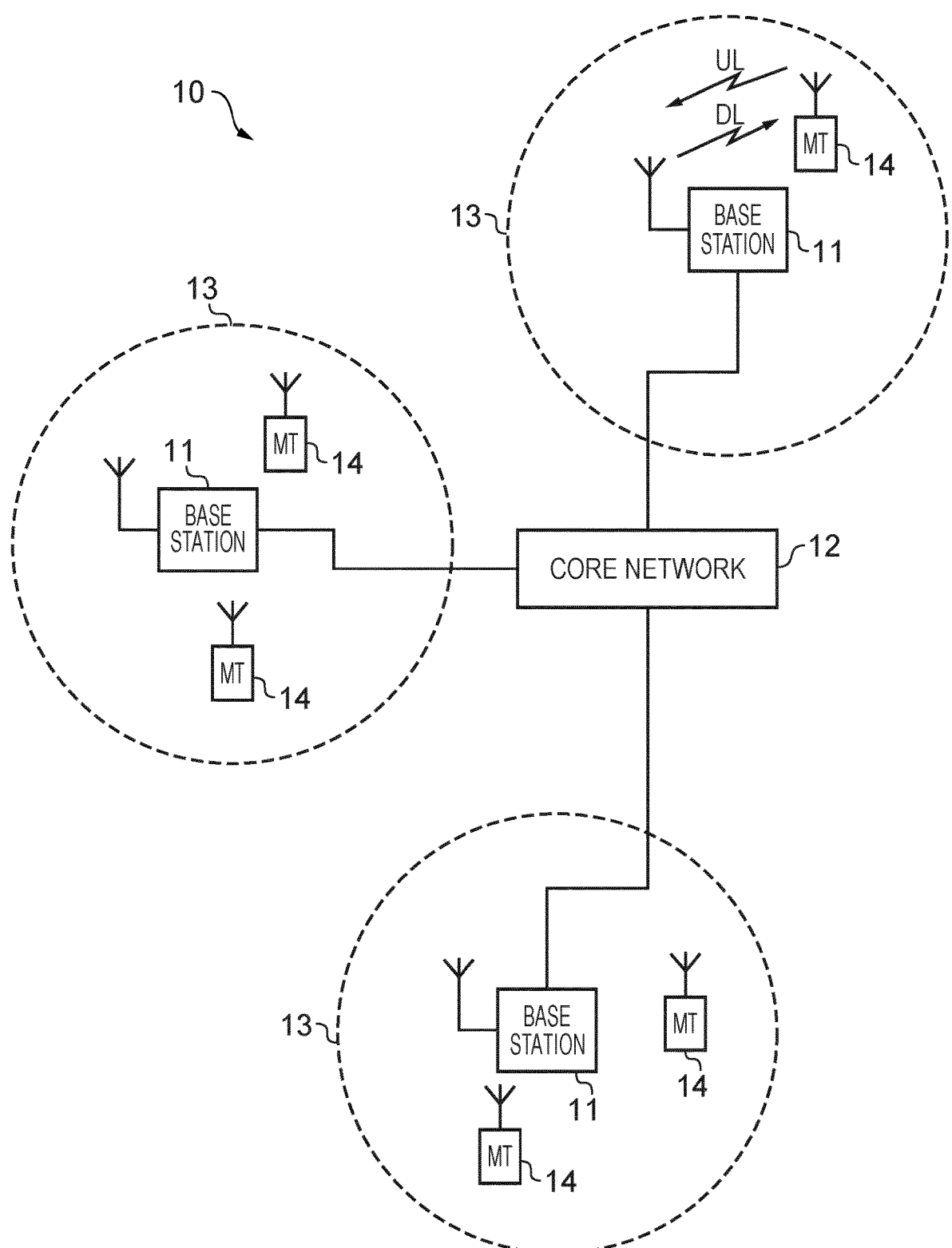
FIG. 1 schematically represents some aspects of an LTE-type wireless telecommunication system which may be configured to operate in accordance with certain embodiments of the present disclosure.

Long Term Evolution (LTE) Wireless Communications System FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards. The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as BSs/transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);

Massive Machine Type Communications (mMTC);

Ultra Reliable & Low Latency Communications (URLLC); and

Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 0.5 ms to 1 ms with reliability of 99.999% to 99.9999%.

The elements of the wireless access network shown in FIG. 1 may be equally applied to a 5G new RAT configuration, except that a change in terminology may be applied as mentioned above.

Figure 2:
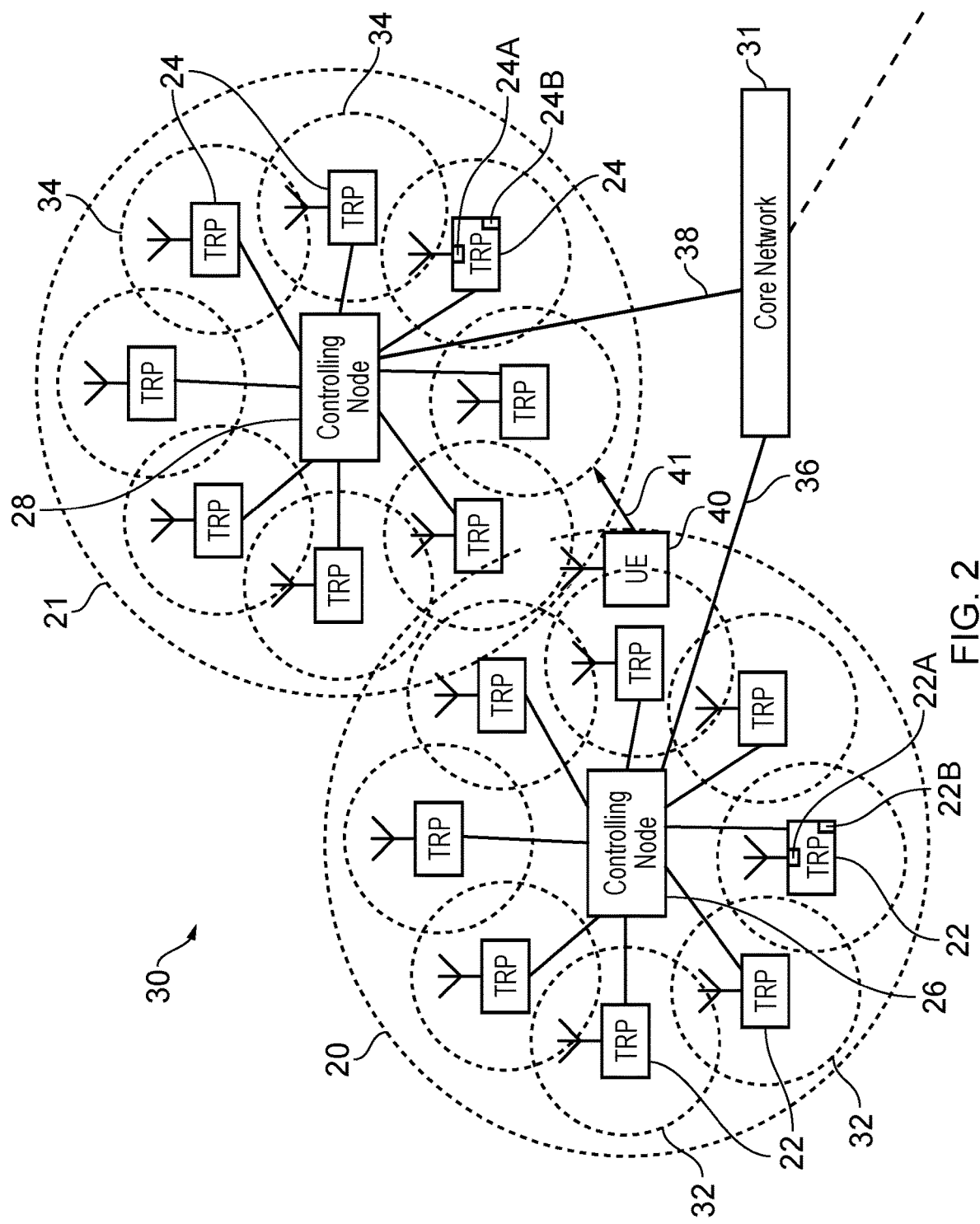
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
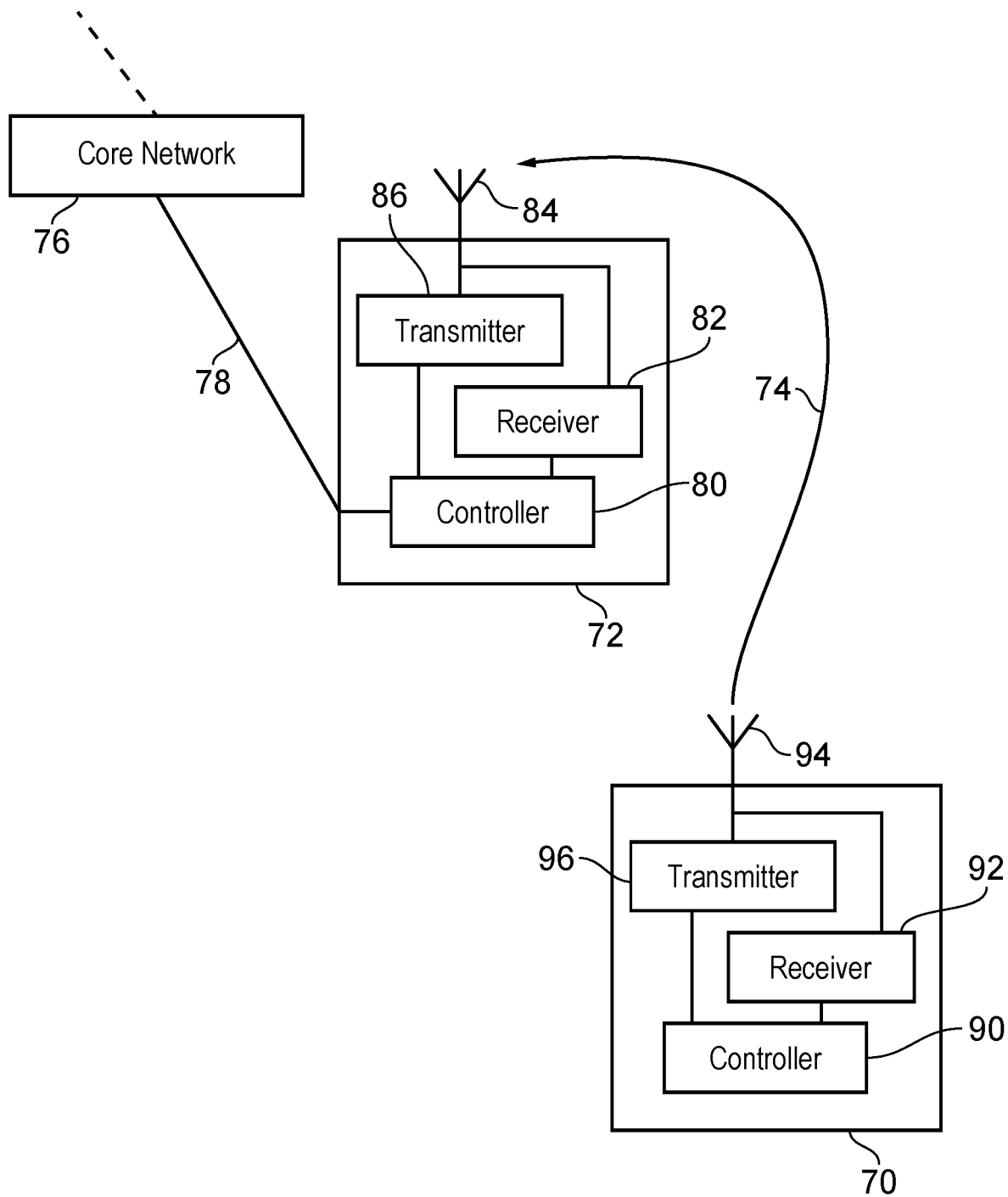
FIG. 3 is a schematic block diagram of an example infrastructure equipment and communications device configured in accordance with example embodiments of the present disclosure.

A more detailed illustration of a communications device 70 and an example network infrastructure equipment 72, which may be thought of as a base station/eNB/gNB 11 or a combination of a controlling node 26, 28 and TRP 22, 24, is presented in FIG. 3. As shown in FIG. 3, the communications device 70 is shown to transmit uplink data to the infrastructure equipment 72 via resources of a wireless access interface as illustrated generally by an arrow 74. The communications device 70 may also receive downlink data transmitted by the infrastructure equipment 72 (not shown). As with FIGS. 1 and 2, the infrastructure equipment 72 is connected to a core network 76 (which may correspond to the core network 12 of FIG. 1 or the core network 31 of FIG. 2) via an interface 78 to a controller 80 of the infrastructure equipment 72. The infrastructure equipment 72 may additionally be connected to other similar infrastructure equipment by means of an inter-radio access network node interface, not shown in FIG. 3.

The infrastructure equipment 72 includes a receiver 82 connected to an antenna 84 and a transmitter 86 connected to the antenna 84. Correspondingly, the communications device 70 includes a controller 90 connected to a receiver 92 which receives signals from an antenna 94 and a transmitter 96 also connected to the antenna 94. The controller 80 is configured to control the infrastructure equipment 72 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 80 may comprise circuitry which is suitably configured/programmed to provide the desired functionality using conventional programming/configuration techniques for equipment in wireless telecommunications systems. The transmitter 86 and the receiver 82 may comprise signal processing and radio frequency filters, amplifiers and circuitry in accordance with conventional arrangements. The transmitter 86, the receiver 82 and the controller 80 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 72 will in general comprise various other elements associated with its operating functionality. Correspondingly, the controller 90 of the communications device 70 is configured to control the transmitter 96 and the receiver 92 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 90 may comprise circuitry which is suitably configured/programmed to provide the desired functionality using conventional programming/configuration techniques for equipment in wireless telecommunications systems. Likewise, the transmitter 96 and the receiver 92 may comprise signal processing and radio frequency filters, amplifiers and circuitry in accordance with conventional arrangements. The transmitter 96, receiver 92 and controller 90 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s).

As will be appreciated the communications device 20 will in general comprise various other elements associated with its operating functionality, for example a power source, user interface, and so forth, but these are not shown in FIG. 3 in the interests of simplicity. The controllers 80, 90 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 4:
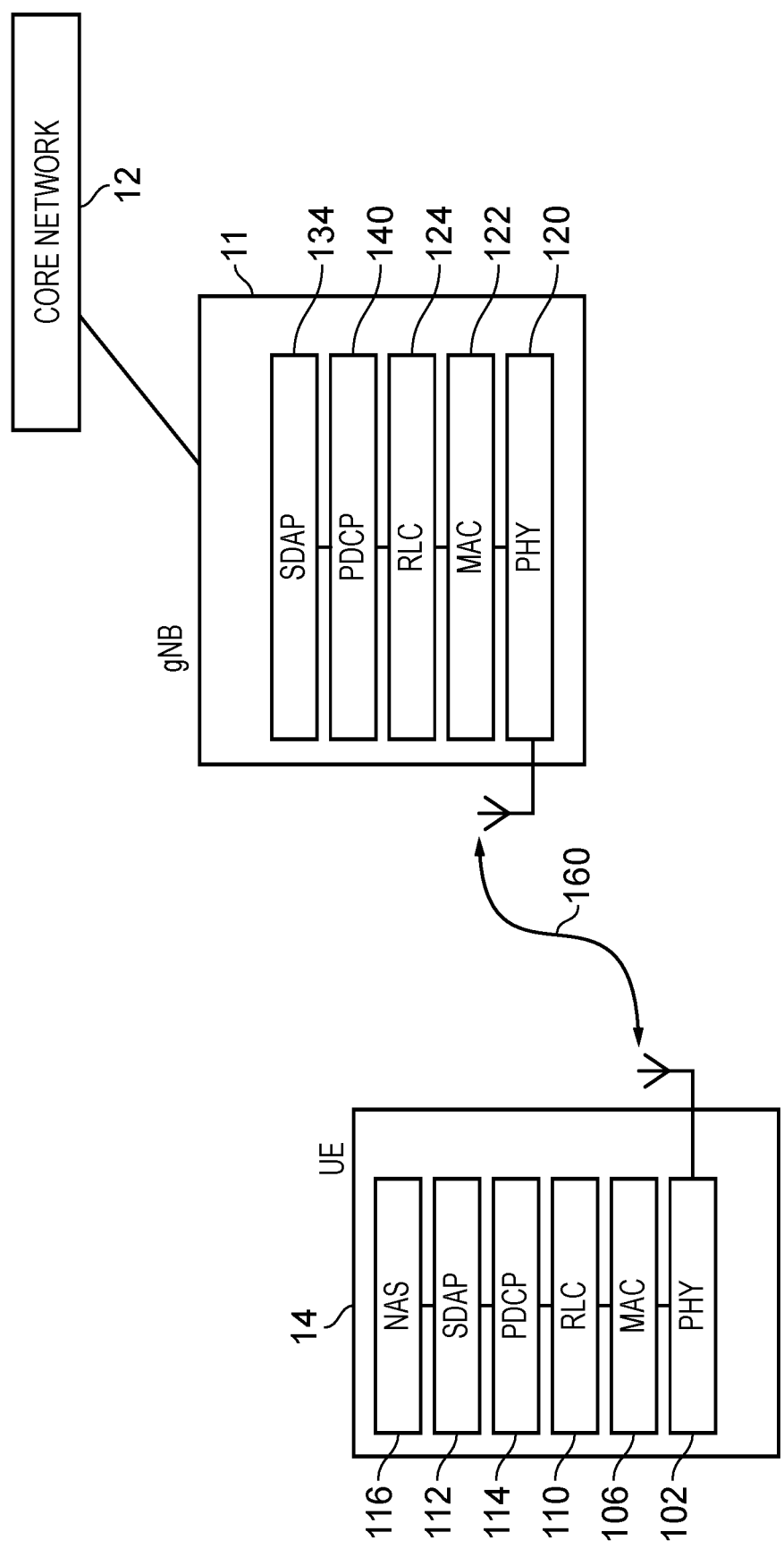
FIG. 4 is a block diagram showing logical protocol entities within a communications device and infrastructure equipment which may be configured to operate in accordance with example embodiments of the present technique.

FIG. 4 is a block diagram showing logical protocol entities within a communications device 14 and the infrastructure equipment 11 which may be configured to operate in accordance with example embodiments of the present technique. The communications device 14 may broadly correspond to the communications device 70 illustrated in FIG. 3 and described above. The infrastructure equipment 11 may broadly correspond to the infrastructure equipment 72 illustrated in FIG. 3 and described above.

Protocol entities may be characterised by functions which they provide to other protocol entities. For example, a physical layer (PHY) protocol entity 102 may control the transmitter 96 and receiver 92 to transmit and receive signals representing data on the wireless access interface. The PHY protocol entity 102 may thus provide an encoding and modulation function for data transmission, and a demodulation and decoding function for data reception. The PHY protocol entity 102 may provide these services to a medium access control (MAC) protocol entity 106 which in turn provides services to a radio link control (RLC) protocol entity 110. The RLC entity 110 interacts with a packet data convergence protocol (PDCP) entity 114, which in turn receives data for transmission from, and passes received data to, a non-access stratum (NAS) layer 116. The NAS layer may be an example of an 'upper layer', with respect to the access stratum (AS) layer comprising the PDCP protocol entity 114 and lower layer protocol entities. In addition, an SDAP (Service Data Adaptation Protocol) protocol entity 112, may reside on top of (i.e. at a higher logical layer than) the PDCP protocol entity 114. Data may be communicated between the communications device 14 and the infrastructure equipment 11 via a wireless access interface 160.

The infrastructure equipment 11 has an RLC entity 124 which has as a peer the RLC entity 110 of the communications device 14 for each radio bearer. The infrastructure equipment 11 has a MAC protocol entity 122 being the peer of the corresponding MAC entity 106 of the communications device 14, and a PHY entity 120 being a peer of the corresponding PHY entity 102 of the communications device 14. At the PDCP protocol layer, the PDCP entity 114 of the communications device 14 has as its peer a PDCP entity 140 of the infrastructure equipment 11. Similarly an SDAP entity 134 of the infrastructure equipment 11 is the peer of the communications device's SDAP entity 116.

Each protocol entity in the communications device 14 may be implemented by the controller 90 in combination with the receiver 92 and transmitter 70 of the communications device. Similarly, each protocol entity in the infrastructure equipment 11 may be implemented by the controller 80 in combination with the receiver 82 and transmitter 86 of the infrastructure equipment.

Orthogonal Frequency Division Multiplexing (OFDM)

Figure 5:
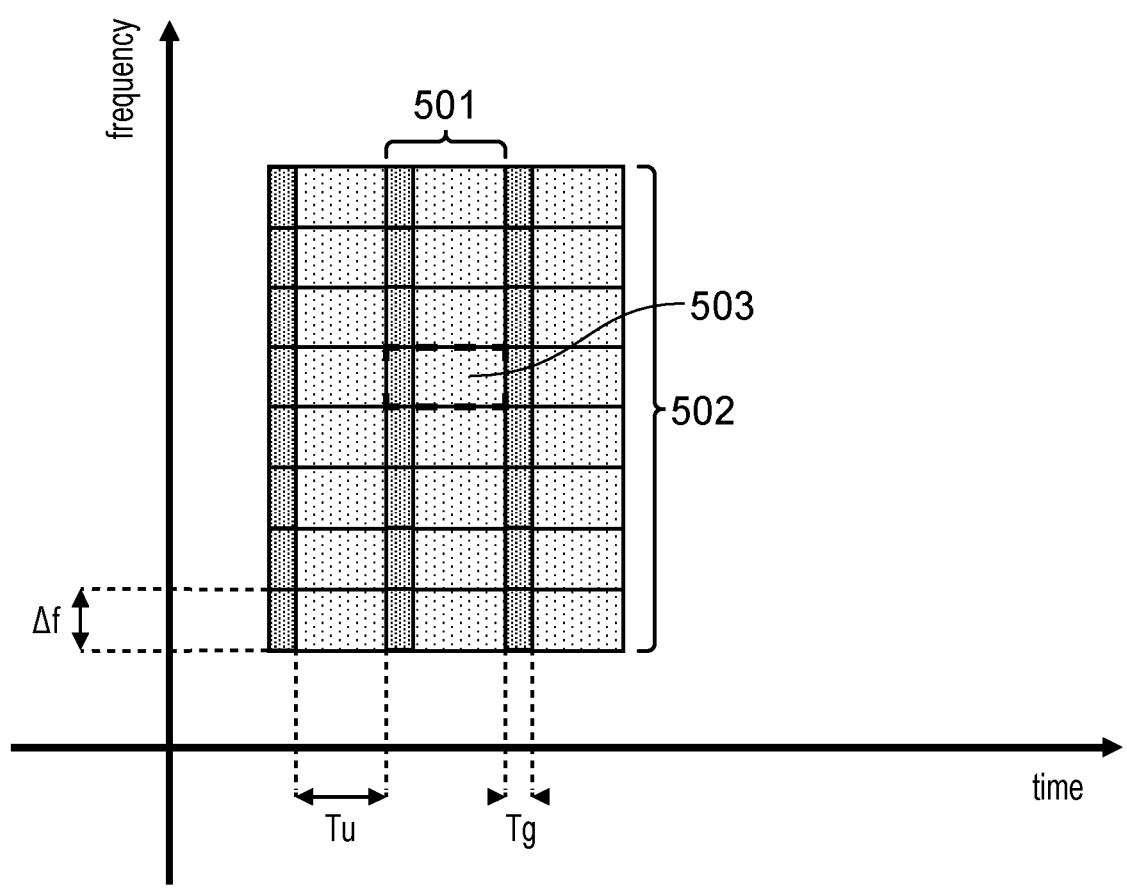
FIG. 5 shows an example of an orthogonal frequency division multiplexing (OFDM) frequency-time grid.

Many wireless and mobile communication systems such as WiFi (802.11xx), 4G (LTE) and 5G (NR) systems employ orthogonal frequency division multiplexing (OFDM) at the physical layers. FIG. 5 illustrates an example OFDM frequency-time grid. In OFDM systems, the radio or component carrier is split in frequency into many narrowband subcarriers of bandwidth f known as the subcarrier spacing. Each subcarrier is then modulated with m bits of information for a short duration $Tu=1/\Delta f$—known as the OFDM symbol duration using for example, a quadrature amplitude modulation (QAM) with an alphabet size of $2^m$. At the end of the OFDM symbol duration, the modulating QAM symbol for each of the subcarriers is changed and another OFDM symbol 501 built. An OFDM symbol 501 of duration Tu is therefore comprised of Nu subcarriers 502 each with subcarrier spacing of $\Delta f$ Hz. The physical layer signal can therefore be conceived of as a time-frequency grid of OFDM symbols 501 each of Nu subcarriers 502 and a duration Tu as illustrated in FIG. 5. In wireless systems utilising physical layer signals such as that illustrated by FIG. 5, a guard interval or cyclic prefix of duration Tg much less than the OFDM symbol duration Tu is inserted at the start of each OFDM symbol 501 to help mitigate inter-symbol interference at the receiver between adjacent OFDM symbols 501 arising from multipath propagation. One cell in the grid 503—a subcarrier of a given OFDM symbol 501 is often referred to as a resource element (RE) and can be used to carry information such as one point of a given QAM constellation.

Mobile communications link layer capacity is measured in at least two ways. One measure is throughput that measures the proportion of MAC transmitted packets that are successfully received by the receiver. Mobile communication MAC layers employ HARQ—to improve the probability that a given packet will ultimately be received successfully. In this, the systems incorporate feedback from the receiver to the transmitter to inform the transmitter when a given transmission of a packet was not successful. This causes the transmitter to retransmit the MAC packet, wait for feedback from the receiver, retransmit, and wait again until the receiver confirms successful reception. Often, a limit is set for the number of allowed retransmissions. When this limit is exceeded, the transmitter marks the packet as lost and stops further retransmission of the said packet. Such a packet is then counted amongst the proportion that were not successfully received. Another measure of link layer capacity is bit rate. This counts the number of transmitted bits that are successfully received over a given time. Thus, in a system in which every MAC packet is successfully received but always after one retransmission, the throughput (as the proportion of successfully transmitted packets) is 100% but the bit rate is only 50% of the bit rate of the system compared to a situation in which every packet was successfully received without the need for a retransmission. In all wireless and mobile communication systems, the link layer design goal is to maximise both forms of throughput measures.

Link Adaptation

The lower layers (datalink and physical layers) of a mobile communication system are designed to create a radio waveform used for conveying data between a transmitter and receiver given some expected radio propagation conditions between the communicating gNB and the UE. In traditional link-layer designs, these layers are designed to allow the radio-communication system to cope with a given degree of radio propagation impairment. The success of mobile communication systems over the last few decades has been mainly due to the adoption of link adaptation that helps to maximise the throughput. In mobile communication systems such as 3G, 4G and 5G, the link-layer is designed with many choices for the forward error correction (FEC) code rates, modulation constellations, waveform type, transmit power levels. These can be jointly selected into sets of transmission parameters. Each set can be thought of as a parametrisation for the generation of the transmitted signal resulting from the joint choices that make the set. A given set is expected to generate a waveform or signal for transmission that is different from what another set would generate. Therefore, a deliberate choice can be made of a particular set of transmission parameters with the expectation that it would generate a transmission signal that is somehow more suitable for a prevailing set of radio channel propagation conditions than another set.

This method of designing link-layers is rather long-winded and laborious because it is difficult to deliberately determine the set of choices for all the configuration parameters. This is firstly, and especially, because the process of choosing between particular communication signal processing techniques such as FEC coding schemes (Low Density Parity Check (LDPC) codes, Turbo codes, or Polar codes, for example) is not trivial. Secondly, this is because even after a particular communication signal processing technique has been chosen, deciding on the set of possible configurations of the chosen technique that have to be designed and standardised is also an onerous process. As an example, if only the FEC is considered, then the radio communication system designer may have to first choose the FEC scheme (LDPC, Turbo or Polar codes etc.), then having chosen the FEC scheme, would need to then decide what block sizes and code rates to support etc. before proceeding to a similar process for modulation constellations etc.

Assuming that the radio-communication system has been designed already, such a system design has already chosen a coding scheme. In addition, it supports a designed number of possible codeword block sizes, a designed number of code rates per block size, a designed number of modulation constellations etc.

Link adaptation allows the UE and gNB to work together to determine automatically:
1. the prevailing radio propagation conditions that will affect the transmitted data; and
2. the most appropriate set of link-layer configuration parameters (block size, code rate, modulation constellation etc.) to use so as to maximise throughput and/or transmission resource utilisation for the transmitted data within target reliability and/or latency under the prevailing radio propagation conditions.

This choice of an appropriate set of link-layer configuration parameters is also not trivial as it presents a somewhat multi-dimensional problem with the decision depending for example on the given transmission block size and the prevailing radio propagation channel conditions etc. Link adaptation in 4G and 5G systems is limited to the selection of a configuration from amongst a set of designed choices. For link adaptation of the DL, the UE measures channel quality parameters on the reception of reference signals transmitted by the BS. The channel quality is then signalled to the BS as a channel quality indicator (CQI) that can be either narrowband or wideband depending on the bandwidth of the reference signals used for its measurement. Based on this CQI report from the UE, the BS can adapt its DL transmissions to maximise throughput. Similarly, for the UL the BS measures channel quality parameters from reception of sounding reference signals (SRS) transmitted by the UE and uses the results of these measurements to instruct the UE how to adapt UL transmissions to maximise throughput. In 4G and 5G systems, since the FEC type for data channels is fixed, link adaptation therefore only involves the selection from a set of possible FEC code rates and modulation constellations—i.e. the modulation and coding scheme (MCS). Transmit power can also be thought of as an aspect of link adaptation, but is not typically adjusted per transmission block. In such 4G and 5G systems the performance of the link-layer for a given resource allocation (using the two throughput measures explained above) is limited by the radio channel propagation conditions. Firstly, multipath propagation results in frequency selective fading whilst co-channel and adjacent channel interference from transmissions by other base stations and/or terminal devices (UEs) add to the noise. All of these have the effect of reducing the signal to interference and noise power ratio (SINR) of the channel. Secondly, mobility of the UEs and/or objects around the UE or base station further results in time variation of the channel.

For optimum performance, link-layer transmissions in a radio-communication system are supposed to be carefully adapted to the prevailing radio propagation conditions between the transmitter and receiver. As described above, link adaptation in existing 4G and 5G systems is limited to a selection of an MCS configuration from amongst the set of designed choices. Firstly, this choice is typically sub-optimal because there is a finite set of configurations to choose from and secondly, there may be propagation conditions for which none of the existing choices is optimum. The reason for this latter point is that during the link-layer design phase it is not possible to consider all the possible radio propagation conditions that the system would ever be used for. Thirdly, determining the prevailing radio propagation conditions during operation is not a trivial task either. The CQI used in 4G and 5G systems is too much of a coarse indicator addressing mostly the signal to interference and noise ratio (SINR)-related propagation conditions. Other relevant radio propagation conditions may include characteristics such as fading loss, time/frequency selectivity, channel delay spread, Doppler frequency spread, noise, interference, SINR etc. If all these radio channel propagation attributes were assessed, link-adaptation can be more granular and could entail changing any of the code rate, modulation constellation, transmission power, waveform, the number of transmit antennas, frequency hopping pattern etc.

For a fixed radio communication system in which both the BS and the terminals are stationary, the radio propagation conditions are dominated by the geography of its general location. The most optimum link-layer is one designed by taking into account the dominant radio propagation conditions arising from the geography of the given environment. For a mobile communication system however, the UEs move and so the propagation conditions change in accordance with the UEs position within the coverage area of the base station (eNodeB or gNodeB), although these are still significantly influenced by the geography of the area that surrounds the base station. In general, therefore, the range of radio propagation conditions between the base station and UE are influenced by the geography of the surrounding area and this geography is of course different from base station to base station. For example, a BS next to a motorway will likely serve many high speed UEs compared to a BS located in a built-up residential area. The signal received by UEs from a BS next to a mountain or high-rise buildings will be more frequency selective due to multipath propagation than from a BS located in the middle of a flat plain with only low-rise or no buildings.

In accordance with embodiments of the present technique as described herein, a multi-carrier transmission system is assumed with the intention of using a single tap or zero-forcing channel equaliser so as to ease analysis but the equivalent analysis can also be carried out for a single carrier transmission system or indeed a multi-carrier system with other types of receivers. In a multi-carrier transmission system based for example on OFDM such as LTE and NR, for a given OFDM symbol, the propagation channel combined with transmitter and receiver degradations can be described as:

$$B(k) = H(k)e^{j(w_D + w_O)} + N(k)$$

where:
- $w_D$ is the doppler frequency in radians per second due to relative movement between the transmitter and the receiver;
- $w_O$ is the combined transmitter and receiver frequency offsets in radians per second; and
- $N(k)$ is the combined noise and interference from all sources impinging on subcarrier k The channel transfer function H(k) can be further expressed as:

$$H(k) = |H(k)|e^{j(\Delta_k + k\emptyset)}$$

where:
- $\Delta_k$ is the subcarrier phase shift due to the channel;
- $\emptyset$ is the phase slope due to any timing offset; and
- $|H(k)|$ is the amplitude fading coefficient of subcarrier k shaped by frequency selectivity due to multipath propagation.

Assuming all these quantities except for the noise N(k) are known by the receiver, then the effect of the channel on the received signal R(k) can be reversed by multiplying R(k) by Z(k) defined as:

$$Z(k) = \frac{1}{|H(k)|}e^{-j(\Delta_k + k\emptyset + w_D + w_O)}$$

A situation can therefore be envisaged in which if the transmitter knew that its current transmission will traverse a channel whose transfer function is B(k), it could pre-distort its transmissions D(k) by Z(k) such that the received signal R(k) would then be given by:

$$R(k) = D(k)B(k)Z(k)$$

If the noise term N(k) is ignored, then R(k)=D(k) since B(k)Z(k)=[1].

The effect of the noise can also be taken into account by choosing each D(k) from an alphabet of transmission symbols whose size is such that the expected decoding performance can be achieved with the signal to noise ratio that arises from the noise power $|N(k)|^2$. This can be calculated for example by using the Shannon capacity equation:

$$b(k) = \left\lceil W\log_2\left(1 + \frac{|H(k)|^2}{|N(k)|^2}\right)\right\rceil$$

where W is the subcarrier bandwidth and b(k) is the number of bits to carry in subcarrier k using a constellation of size $2^{b(k)}$. This presupposes that we also have knowledge of the noise term N(k). The use of the ceiling operator $\lceil . \rceil$ reflects the desire to maximise the probability of correct decoding as a series of b(k) on the high side will result in the use of a lower rate FEC code. Also, the Shannon channel capacity equation relates to intrinsic information capacity anyway. Here, the bits that it is desired to carry are coded bits.

This means that the choice of constellation for each individual subcarrier in each OFDM symbol will depend on the signal to interference and noise power ratio (SINR) expected at that subcarrier at the receiver during the said OFDM symbol. Therefore, for subcarriers in which $|N(k)|^2$ is high and so the SINR could be low, D(k) would be taken from a low order constellation such as Quadrature Phase Shift Keying (QPSK) whilst for subcarriers in which $|N(k)|^2$ is low and so the SINR could be high, D(k) would be taken from a higher order constellation such as 64QAM or 256QAM.

Deciding for each subcarrier how many bits b(k) to carry therefore determines the constellation size to use for that subcarrier. Assume that the transmission resource size (number of resource elements (RE) allocated for transmission of the current TB of size L bits) is M—these could be on one or more OFDM symbols. Since b(k) is the number of bits to be carried in subcarrier k, the total number of bits that can be carried in the transmission resource of size M can be calculated and used to determine the optimum FEC code rate for this particular TB as:

$$r = \frac{L}{\sum_{k=0}^{M-1} b(k)}$$

From the above analysis, it is therefore possible that knowing the exact radio channel characteristics that a given transmission will traverse, the transmitter can format the signal it transmits so as to maximise the probability of decoding at the receiver. But, given a multi-carrier transmission system that adopts this paradigm, some questions are:

1. How would the receiver know which constellation was used for each subcarrier?

2. How would the transmitter know the radio channel characteristics that the next transmission block will traverse?
3. What happens if knowledge of the radio channel characteristics is not 100% accurate?

Normally, the lower layers, including the physical layer (PHY) of a mobile communications system are designed to ensure that the mobile communications system continues to work under some predetermined worst case propagation conditions. There are two significant problems with this approach. Firstly, it is difficult apriori to know all possible propagation conditions under which the system may need to operate. This means that for some propagation conditions typically dependent on location, the mobile communications system may not work effectively. Secondly, to enable operation in the worst conditions the system is designed to work under, the system is typically over-engineered for majority of normal operating conditions. Therefore, when propagation conditions are mild and better than the worst case conditions, the system operates inefficiently. Link adaptation has evolved as a means of changing system parameters to use a more efficient configuration of the system when conditions are better than the worst case and to change system parameters to use a less efficient configuration of the system as conditions approach the worst.

Figure 6:
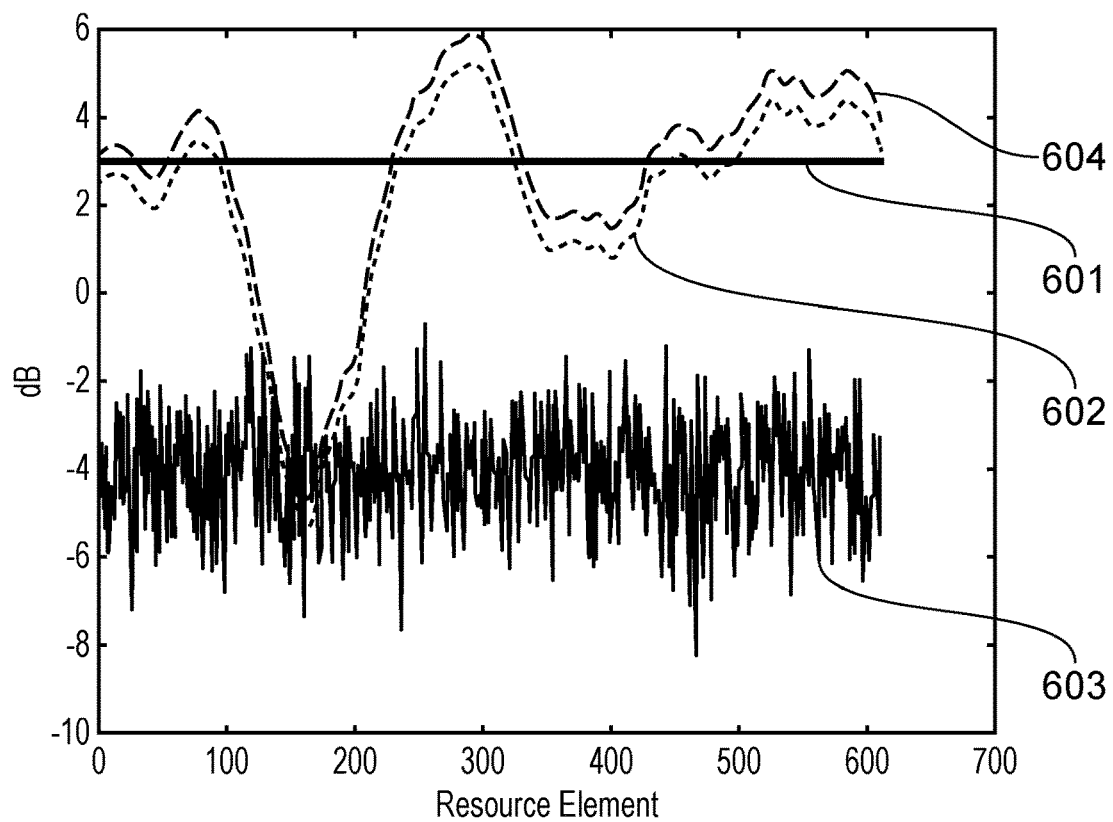
FIG. 6 illustrates a plot of signal to interference and noise power ratio (SINR), channel transfer function (CTF) and noise power per resource element (RE) for a clustered delay line (CDL) channel having a 3 dB signal-to-noise ratio (SNR)

FIG. 6 shows on the same graph a sample plot of (1) the channel transfer function (CTF), illustrated by line 602 indicative of the frequency selective fading suffered by each resource element (RE) of a clustered delay line channel (CDL-C) with a delay spread of 300 ns; (2) the noise power per RE illustrated by line 603 (3) the SINR per RE illustrated with line 604, and with line 601 indicative of the additive white Gaussian noise SNR of 3 dB.

Figure 7:
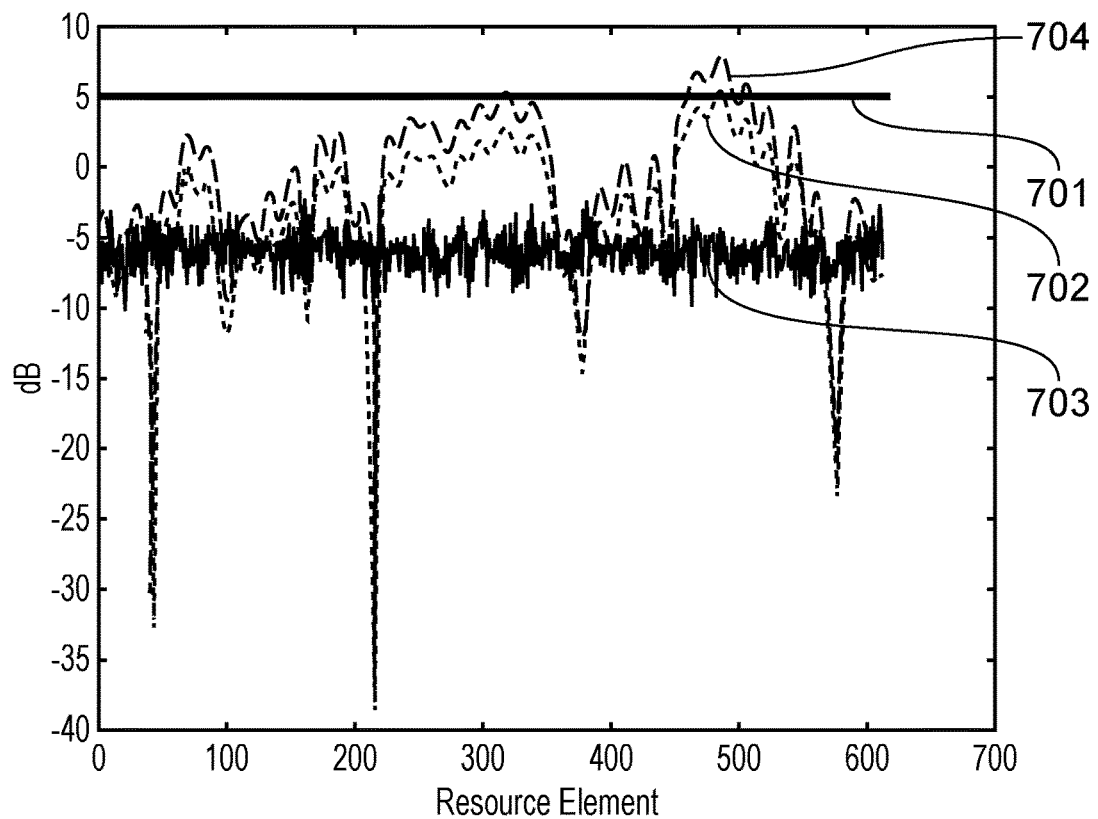
FIG. 7 shows a plot of SINR, CTF and noise power per RE for a tapped delay line (TDL) channel having a 5 dB signal-to-noise ratio (SNR)

FIG. 7 shows a similar plot to that of FIG. 6 but for a tapped delay line channel (TDL-C) with a delay spread of 300 ns with line 701 indicative of the 5 dB SNR. Again, like FIG. 6, FIG. 7 shows the CTF 702, noise power per RE 703, and SINR per RE 704 for the TDL-C. These plots are based on a component channel bandwidth of 20 MHz using a subcarrier spacing of 30 kHz with a resource allocation 51 PRBs wide.

From FIGS. 6 and 7, it can be observed that the SINR per RE is not uniform across the resource allocation bandwidth because of frequency selectivity. Yet with such SINR/RE profiles, LTE and NR use the same modulation scheme per RE across the whole resource allocation. Since the SINR per RE may not be uniform across the resource allocation bandwidth, problems arise in selecting the optimum modulation scheme to use for the REs across the whole resource allocation. Embodiments of the present technique seek to alleviate these issues.

Signalling the Use of Mixed Modulation in Wireless Communications

Figure 8:
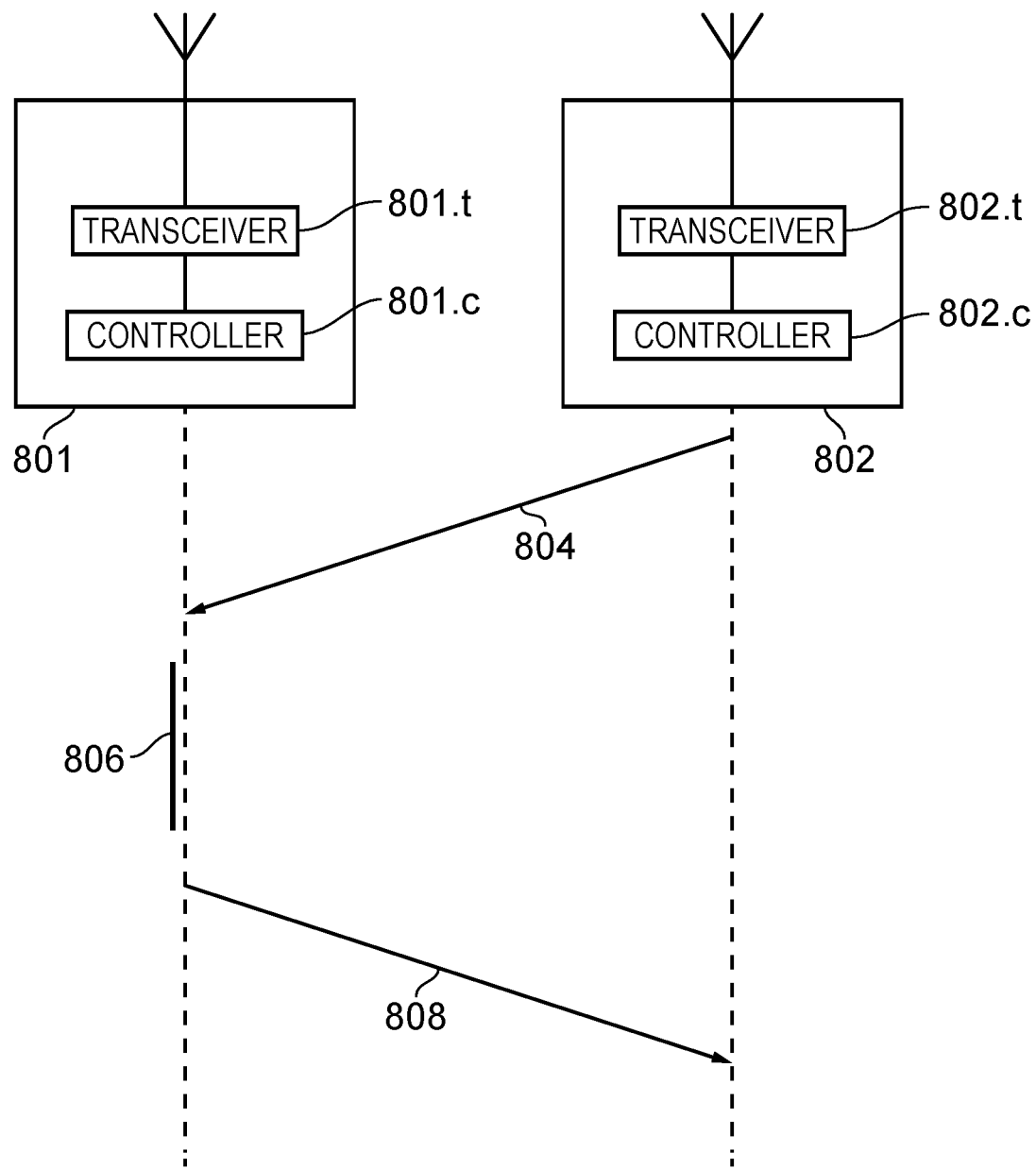
FIG. 8 is a part-schematic, part-message flow diagram representation of a wireless communications system comprising a transmitting entity and a receiving entity in accordance with embodiments of the present technique.

FIG. 8 is a part-schematic, part-message flow diagram representation of a wireless communications system comprising a receiving entity 801 and a transmitting entity 802 in accordance with embodiments of the present technique. In the example of FIG. 8, the receiving entity 801 is an infrastructure equipment and the transmitting entity 802 is a communications device, though the skilled person would be aware that embodiments of the present technique may equally apply to scenarios where an infrastructure equipment is a transmitting entity and a communications device is a receiving entity. The receiving entity 801 is configured to receive data from the transmitting entity 802 via a communications channel between the receiving entity 801 and the transmitting entity 802. The receiving entity 801 comprises a transceiver (or transceiver circuitry) 801.t to transmit signals to and to receive signals from the transmitting entity 802, and a controller (or controller circuitry) 801.c to control the transceiver 801.t to transmit and to receive the signals. Correspondingly, the transmitting entity 802 comprises a transceiver (or transceiver circuitry) 802.t to transmit signals to and to receive signals from the receiving entity 801, and a controller (or controller circuitry) 802.c to control the transceiver 802.t to transmit and to receive the signals. Each of the controllers 801.c, 802.c may be, for example, a microprocessor, a CPU, or a dedicated chipset, etc. Each of the transceivers 801.t, 802.t may be an integrated unit comprising elements which are configured to either transmit or to receive signals via one or more antennas, or may instead be formed of separate transmitters and receivers configured to transmit/receive signals via the antennas.

The controller circuitry 801.c of the receiving entity 801 is configured in combination with the transceiver circuitry 801.t of the receiving entity 801 to receive 804 first control signalling from the transmitting entity 802, the first control signalling requesting a resource allocation within which the transmitting entity 802 is to transmit data to the receiving entity 801, to determine 806 a resource allocation of the communications channel for the transmitting entity 802 to transmit the data to the receiving entity 801, and to transmit 808 second control signalling to the transmitting entity 802, the second control signalling comprising an indication of the resource allocation. The second control signalling defines which of a plurality of modulation schemes is to be used by the transmitting entity 802 for each of a plurality of time-divided units of the resource allocation and/or each of a plurality of frequency-divided sub-regions of the resource allocation, wherein the second control signalling defines at least two of the plurality of modulation schemes.

Essentially, embodiments of the present technique propose that more than one modulation scheme can be signalled for a single resource allocation, in order to exploit changing channel conditions within that single resource allocation. It can be expected that a scheme in which the size of the QAM constellation used for each RE depends on the SINR of the particular resource element will produce better link adaptation and hence higher throughput. Thus in REs where the SINR is very low (such as RE(215) that suffers a fade of more than 35 dB in FIG. 3 with SINR less than −35 dB), a lower QAM constellation such as Binary Phase Shift Keying (BPSK) is used whilst in REs such as RE(500) subjected to constructive superposition such that its SINR is more than 7 dB a larger QAM constellation such as 16QAM can be used. Embodiments of the present technique also seek to address how the transmitter is able to know the SINR per RE, how it determines from the SINR the size of the QAM constellation to use for that RE and how the receiver knows the choice that the transmitter has made for each RE.

In co-pending European patent application with application number EP19209541.2 [3], it is outlined how the transmitter (gNB or BS for downlink and UE for the uplink) can transmit suitably designed reference symbols to allow the receiver to estimate the channel transfer function, the noise and interference power per RE and with these calculate the SINR per RE for the link from the transmitter to the receiver. Using this SINR per RE, the receiver can then apply Shannon's channel capacity theorem to calculate the number of bits that can be carried by this RE using Equation (1) below:

$$b(l,k) = Q(\Delta f T_s \log_2(1 + \text{SINR}(l,k))) \qquad (1)$$

where Δf is the subcarrier spacing in Hz, $T_s=T_u+T_g$ (≪1s) is the OFDM symbol duration in seconds inclusive of any cyclic prefix; b(l, k) is the number of bits to be carried in subcarrier k of OFDM symbol l using a QAM constellation of size $2^{b(l,k)}$ and SINR(l, k) is the signal power to interference and noise power ratio at subcarrier k of OFDM symbol l. The function Q(·) is a quantizer that ensures that only square QAM constellations in which b(l, k)∈{1,2,4,6,8} (i.e. BPSK, QPSK, 16QAM, 64QAM, 256QAM) are considered. The usual Shannon capacity equation calculates the channel capacity in bits per second. To convert this to bits per OFDM symbol, this can be multiplied by the symbol time $T_s$ which is significantly less than one second.

In other words, the determining the resource allocation may comprise the receiving entity (where the receiving entity is an infrastructure equipment and the transmitting entity is a communications device) being configured to estimate, for each of the plurality of time-divided units of the resource allocation and/or each of the plurality of frequency-divided sub-regions of the resource allocation, values of one or more channel attributes of the communications channel. The receiving entity may be configured to receive one or more reference symbols from the transmitting entity, and to estimate the values of the one or more channel attributes of the communications channel based on the received reference symbols. Here, the modulation scheme that is to be used by the transmitting entity for each of the plurality of time-divided units of the resource allocation and/or each of the plurality of frequency-divided sub-regions of the resource allocation may then depend on the values of the one or more channel attributes for the each of the plurality of time-divided units of the resource allocation and/or the each of the plurality of frequency-divided sub-regions of the resource allocation.

The receiving entity (where the receiving entity is an infrastructure equipment and the transmitting entity is a communications device) may also be configured to determine, based on the values of the one or more channel attributes of the communications channel, a maximum number of bits that can be carried by each of the plurality of time-divided units of the resource allocation and/or each of the plurality of frequency-divided sub-regions of the resource allocation. Subsequently the receiving entity may be configured to perform a quantization operation on the maximum number of bits for each of the plurality of time-divided units of the resource allocation and/or each of the plurality of frequency-divided sub-regions of the resource allocation.

On the other hand, where the receiving entity is a communications device and the transmitting entity is an infrastructure equipment, the receiving entity may be configured to receive one or more reference symbols from the transmitting entity. The receiving entity may then be configured to estimate, based on the received reference symbols, values of one or more channel attributes of the communications channel. Following this, the receiving entity may then be configured to transmit, to the transmitting entity, second control signalling comprising the estimated values. The transmitting entity is configured to determine, based on the values of the one or more channel attributes of the communications channel received via the second control signalling, a maximum number of bits that can be carried by each of the plurality of time-divided units of the resource allocation and/or each of the plurality of frequency-divided sub-regions of the resource allocation.

Similarly to the above-described scenario in which the receiving entity is an infrastructure equipment, where the receiving entity is a communications device and the transmitting entity is an infrastructure equipment, the receiving entity may also be configured to determine, based on the values of the one or more channel attributes of the communications channel, a maximum number of bits that can be carried by each resource element. Subsequently the receiving entity may be configured to perform a quantization operation on the maximum number of bits that each resource element can carry. Such information (relating to the maximum number of bits and the result of the quantization operation) may then be transmitted by the receiving entity to the transmitting entity for use in determining the mixed modulation schemes for use across the resource allocation. Such information may be transmitted as part of the second control signalling or as further control information (e.g. in a separate UCI).

Figure 9:
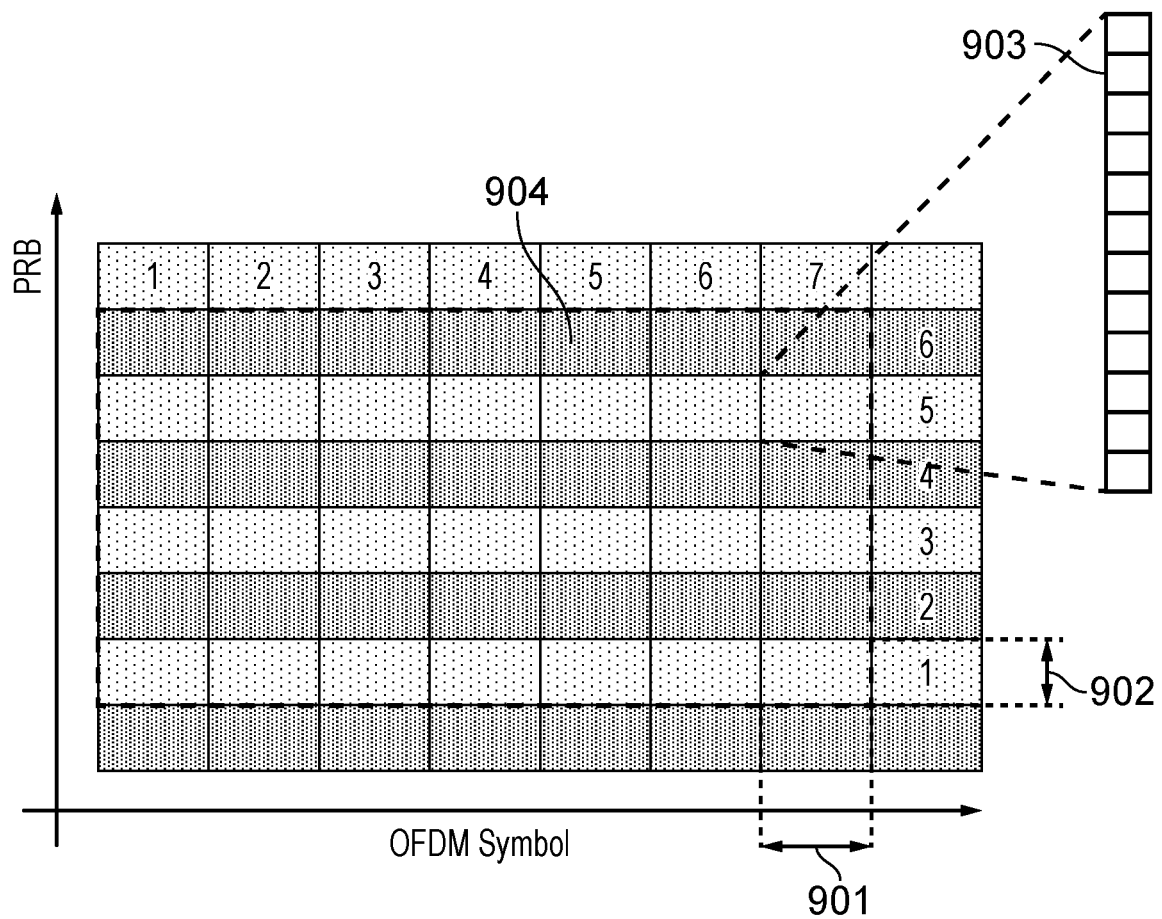
FIG. 9 illustrates a resource allocation that can be used for transmitting either in the downlink or in the uplink in accordance with embodiments of the present technique.

FIG. 9 illustrates a resource allocation that can be used for transmitting either in the DL, i.e. using a Physical Downlink Shared Channel (PDSCH) or the UL, i.e. using a Physical Uplink Shared Channel (PUSCH). The resource allocation is characterized as follows: it is formed of a number P of physical resource blocks 902 (PRB)—in the example of FIG. 9, P=6 PRBs 902—per OFDM symbol 901. Each PRB 902 comprises 12 resource elements 903 as illustrated to the right of FIG. 9. The resource allocation spans a number L of OFDM symbols 901—in the example of FIG. 9, L=7 OFDM symbols 901.

The set of mixed modulation values {b(l, k)} calculated at the receiver (for OFDM symbol l=1 . . . L and resource element k=1 . . . $W_A$ where $W_A$=12P is the number of resource elements allocated to be used for payload transmission in one OFDM symbol) has to be communicated to the transmitter as the transmitter needs to use these for determining the modulation for each of the REs allocated for carrying the payload to the receiver. This can be done using Downlink Control Information (DCI) (for envisaged uplink payload transmissions on PUSCH or envisaged downlink payload transmissions on PDSCH for example) or using Uplink Control Information (UCI) (for envisaged downlink payload transmissions on PDSCH for example). If all transmitters and receivers used in the particular wireless communication system can support QAM sizes of $2^m$ where m∈{1,2,4,6,8} (the constellations for this set are: BPSK, QPSK, 16QAM, 64QAM and 256QAM) for example, then at least 3 bits are needed to communicate each value of b(l, k) with a total of 36LP bits needed in the DCI or UCI to indicate all the QAM sizes for an allocation that spans 12P resource elements per OFDM symbol and L OFDM symbols. In the example of FIG. 9 in which P=6, L=7, this would mean 36*6*7=1512 bits, which is clearly a significant number of bits to include in the signalling for a single resource allocation. UCI and DCI represent side information that subtracts from the throughput of the system, so it is useful to reduce the number of bits used in the DCI or UCI as much as possible in order to maximise the link-layer throughput.

In a first arrangement of embodiments of the present technique, the reduction in the number of bits needed in the DCI/UCI for signalling the mixed modulation used for such a resource allocation is achieved by transmitting only one number of bits per RE value B(l, n) to be used for all the REs in PRB n of OFDM symbol l instead of a separate value b(1, k) for each RE. In other words, in the first arrangement, the second control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs the time-divided units of the resource allocation each being one OFDM symbol.

As a PRB in NR is made up of 12 resource elements per OFDM symbol, this reduces the number of bits required for signalling the mixed modulation scheme in the UCI/DCI to 3PL bits for an allocation comprised of P PRBs per OFDM symbol and spanning L OFDM symbols. In the example of FIG. 9 in which P=6, L=7, this results in only 3*6*7=126 bits. Such an arrangement can be achieved by using one of two methods for calculating B(l, n), utilising either of Equations (2) or (3) below:

1. Each bits-per-RE value $b_n(l, k)$ related to RE k of PRB n in OFDM symbol l is calculated separately using Equation (1) above. The bits-per-RE values of all the 12 REs in PRB n of OFDM symbol l are then averaged together and the result quantized to derive the single bits per RE value B(l, n) to be applied to all REs in PRB n of OFDM symbol l.

$$B(l, n) = Q\left(\sum_{k=1}^{12} b_n(l, k)/12\right) \quad (2)$$

2. The SINR is calculated over PRB n of OFDM symbol l as a whole and then used in the Shannon channel capacity equation to calculate and quantize B(l, n). The PRB SINR is calculated by averaging all the signal powers at all 12 REs of PRB n, averaging all the noise and interference powers at all 12 REs of PRB n and then calculating the ratio between the averaged signal power and the averaged noise and interference powers before applying Equation (1).

$$B(l, n) = Q\left(\Delta f T_s \log_2\left[1 + \left(\sum_{k=1}^{12} S_n(l, k)/\sum_{k=1}^{k=12}(N_n(l, k) + I_n(l, k))\right)\right]\right) \quad (3)$$

Where $S_n(l, k)$ is the signal power, $N_n(l, k)$ is the noise power and $I_n(, k)$ is the interference power at resource element k of PRB n, n=1,2,3, ... P of OFDM symbol l and the function Q(.) is designed to quantize its argument to integer values and ensure that only square QAM constellations in which B(l, n)∈{1,2,4,6,8} result.

Such an arrangement of embodiments of the present technique is ideal for application in systems in which resource allocations are done in numbers of PRBs such as in LTE, NR and similar. The frequency selectivity of mobile channels has a property of coherence bandwidth. The coherence bandwidth of a frequency selective channel is the amount of contiguous bandwidth over which the channel conditions remain similar over the frequency range of the said bandwidth. As the coherence bandwidth is typically less than the bandwidth of a PRB, it is expected that the channel conditions (e.g. SINR) of each RE within a typical PRB would be similar and therefore using the same QAM size for each RE in a PRB will not cause undue degradation from the ideal. Further, as the bits-per-RE is updated per OFDM symbol in the resource allocation, this first arrangement is especially suited to devices with high-speed mobility.

In a second arrangement of embodiments of the present technique, the reduction in the number of bits needed in the DCI/UCI for signalling the mixed modulation used for such a resource allocation is achieved by designating only one set of mixed modulation values {d(k)} per resource allocation instead of one set per OFDM symbol in the resource allocation. In other words, in the second arrangement, the second control signalling defines which of the plurality of modulation schemes is to be used for each of the plurality of frequency-divided sub-regions of the resource allocation for an entire duration of the resource allocation, the frequency divided sub-regions of the resource allocation being resource elements, REs. Here, a plurality of sets each comprising a plurality of the REs may each form one of a plurality physical resource blocks, PRBs of the resource allocation.

This reduces the number of bits required for signalling the mixed modulation scheme in the UCI/DCI to 36P bits for an allocation comprised of P PRBs per OFDM symbol spanning L OFDM symbols. In the example of FIG. 9 in which P=6, L=7, this results in only 36*6=216 bits. The bits-per-RE value d(k) for RE k of the resource allocation can be calculated using either of two possible methods, utilising either of Equations (4) or (5) below:

1. Each bits-per-RE value b(l, k) for RE k of OFDM symbol l is calculated separately. The bits-per-RE value for all the REs over all the L OFDM symbols whose RE k are on the same subcarrier frequency are then averaged together and the result quantized to derive the bits-per-RE value d(k) to be applied to each RE k in all the OFDM symbols of the allocation.

$$d(k) = Q\left(\sum_{l=1}^{L} b(l, k)/L\right) \quad (4)$$

2. The SINR is calculated for all RE k of all the L OFDM symbols in the resource allocation and then used in the Shannon channel capacity equation to provide d(k). The single value of SINR is calculated by averaging all the signal powers at all L REs of index k, averaging all the noise and interference powers at all L REs of index k and then calculating the ratio between the averaged signal power and the averaged noise and interference powers.

$$d(k) = Q\left(\Delta f T_s \log_2\left[1 + \left(\sum_{l=1}^{L} S(l, k)/\sum_{l=1}^{L}(N(l, k) + I(l, k))\right)\right]\right) \quad (5)$$

Where S(l, k) is the signal power, N(l, k) is the noise power and I(l, k) is the interference power at resource element k of OFDM symbol l and the function Q(.) is a quantization that ensures that only square QAM constellations in which d(k)∈{1,2,4,6,8} result.

Such an arrangement of embodiments of the present technique is ideal for application to systems in which resource allocations are done in slots comprised of contiguous OFDM symbols such as in LTE, NR and similar. There is a time varying channel property of coherence time and this is the time within which it is expected that the channel conditions do not change very much. Coherence time is a function of the speed of mobility of the UE. Such an arrangement is therefore especially applicable when the UE's speed is low. Furthermore, resource allocation schemes in systems such as LTE and NR take into account the maximum channel coherence time when they determine the time span (number of OFDM symbols) of a resource allocation. It is therefore expected that the channel conditions (SINR) over a particular subcarrier will not vary unduly from symbol to symbol within the duration of the resource allocation.

In a third arrangement of embodiments of the present technique, the rationale of the above-described first and second arrangements can be utilised together to provide even more reduction in the number of bits needed in the DCI/UCI for signalling the mixed modulation to the transmitter. This is achieved by designating only one set of mixed modulation values {D(n)} per resource allocation. In other words, in the third arrangement, the second control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

In such an arrangement, the bits-per-RE values D(n) are computed per PRB and used for each PRB n in all the OFDM symbols in the resource allocation. This reduces the number of bits required for signalling the mixed modulation scheme in the UCI/DCI to 3P bits for an allocation comprised of P PRBs per OFDM symbol spanning L symbols. In the example of FIG. 9 in which P=6, L=7, this results in only 3*6=18 bits, which is a significant signalling cost saving compared to the signalling of the mixed modulation scheme individually for every RE. The bits-per-RE values D(n) of PRB n in all the OFDM symbols of the resource allocation can be calculated using any two of the methods described above using Equations (2) to (5):

1. The bits-per-RE values B(l, n) for each PRB n over each OFDM symbol l are calculated. Then D(n) is calculated by averaging B(l, n) for l=1 . . . L OFDM symbols:

$$D(n) = Q\left(\sum_{l=1}^{L} B(l, n)/L\right)$$

The calculation of B(l, n) above can use either of the two methods described above with respect to Equations (2) and (3). In some arrangements, the inner Q(·) applied in the calculation of each B(l, n) may be removed.

2. The bits-per-RE value d(k) for RE k over all the OFDM symbols L is calculated. Then D(n) is calculated by averaging d(k) for k=1 . . . 12 REs that make up PRB n=0 . . . P−1:

$$D(n) = Q\left(\sum_{k=12n}^{12(n+1)-1} d(k)/12\right)$$

The calculation of d(k) can use either of the two methods described above with respect to Equations (4) and (5). In some arrangements, the inner Q(·) applied in the calculation of each d(k) may be removed.

In arrangements of embodiments of the present technique as described herein, the function Q(·) serves two purposes. Firstly, it quantises the output of the Shannon capacity calculation into an integer number of bits. Secondly, it converges to one of m∈ {1,2,4,6,8} since we want to target only BPSK and square constellations.

It would be understood by those skilled in the art that with 3 bits to signal each value, the inclusion of even bigger square QAM constellations can be supported without increasing the size of the signalling, e.g. m∈ {1,2,4,6,8,10,12}. Indeed, Q(·) can also be designed to also support selected non-square QAM constellations such as with m∈ {3,5,7,9} corresponding to 8-PSK, 32-APSK, 128-APSK, 512-APSK, respectively. With 3 bits, 8 different constellations can be employed in the mixed modulation scheme. Furthermore, in a system that only supports m∈ {2, 4,6,8} i.e. QPSK, 16QAM, 64QM, 256QAM, or m∈ {1,2, 4,6} only 2 bits are needed to signal each modulation scheme. This can reduce the number of bits required for signalling the mixed modulation scheme in the UCI/DCI to 2P bits for an allocation comprised of P PRBs per OFDM symbol spanning L symbols. In the example of FIG. 9 in which P=6, L=7, this results in only 2*6=12 bits.

In some arrangements of embodiments of the present technique, the network can select any of the first, second or third arrangement as described above, based on the speed of mobility of the UE or channel selectivity. In other words, one or both of a) the modulation scheme that is to be used by the transmitting entity for each of the plurality of time-divided units of the resource allocation and/or each of the plurality of frequency-divided sub-regions of the resource allocation and b) a size of each of the plurality of time-divided units of the resource allocation and/or each of the plurality of frequency-divided sub-regions of the resource allocation may depend on a mobility of at least one of the transmitting entity and the receiving entity (i.e. the one of the receiving entity or the transmitting entity that is a UE, or any kind of mobile eNB such as a non-terrestrial network (NTN) eNB).. For a high speed UE, the network can select and configure, for example, the second arrangement. For a medium speed UE, the network can configure, for example the first arrangement whilst for a relatively low speed or pedestrian UE, the network can configure, for example, the third arrangement. Such an arrangement can be configured either via RRC signalling or in a DCI/UCI as part of the resource allocation signalling.

Figure 10:
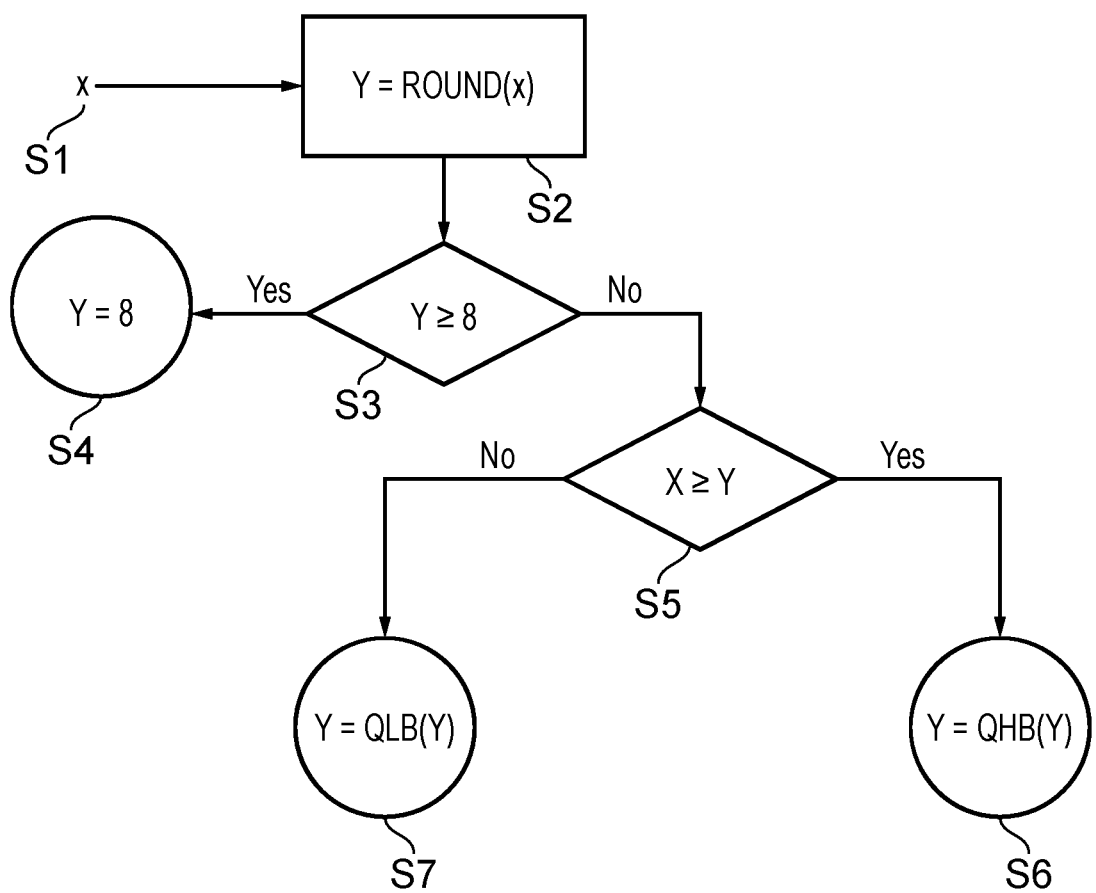
FIG. 10 shows a flow diagram illustrating a first example process in the controller circuitry of the transmitting or receiving entity in a communications system in accordance with embodiments of the present technique.

FIG. 10 shows a flow diagram illustrating a first example process of the controller in either the transmitter or receiving entity in a communications system in accordance with embodiments of the present technique. The process shown by FIG. 10 is an arrangement of the function Q(x).

The method starts in step S1, where the argument x, which is a floating point number is used as an input to a rounding function. During operation of the rounding function in step S2, a rounding of the argument x to the nearest integer is performed. The rounded value of x is then compared to the raw value of x through a number of stages and depending on the result of the comparison, either of two quantizers is used to quantize the result of the rounding such that it outputs a square QAM size. Firstly, if Y the rounded value of x is higher or equal to 8, as compared in step S3, the rounded value Y is set in step S4 to be 8, no matter how high the value of x really is; this corresponds to the maximum available QAM size that can be transmitted being 256QAM. Those skilled in the art would realise that if the maximum QAM size was for example 1024QAM, then this value would be 10 instead of 8. In this case, if the rounded value Y is not 8 or higher, it is compared to the raw value of x; in step S5. If the raw value of x is larger than or equal to the rounded value Y, a first quantizer using function QHB(y) is employed in step S6. On the other hand, if the raw value of x is less than the rounded value Y, a second quantizer using function QLB(y) is employed in step S7.

Essentially, in other words, in this arrangement described with respect to FIG. 10 defining the function Q(x), the quantization operation comprises, for the each of the plurality of time-divided units of the resource allocation and/or the each of the plurality of frequency-divided sub-regions of the resource allocation, the receiving or transmitting entity being configured to round the maximum number of bits to a closest one of a plurality of values each associated with one of the plurality of modulation schemes, and to select the one of the plurality of modulation schemes associated with the rounded maximum number of bits.

The function QHB(y) chooses the QAM constellation size in a manner as to bias the output towards bigger QAM constellations, whilst the function QLB(y) chooses the QAM constellation size in a manner as to bias the output towards smaller QAM constellations. The pseudo code below describes each of these functions for an arrangement in which the system supports only $2^m$ QAMs, for which $m \in \{1,2,4,6,8\}$:

```
Y = QHB(x)                    Y = QLB(x)
HighBias = [1 ,2, 2, 4, 4, 6, 6, 8,   LowBias = [1, 1, 2, 2, 2, 4, 4, 6,
8];                           6];
  If (x > 8)                    If (x < 1)
    Y = 8                         Y = 1
  else                          else
    Y = HighBias(x)               Y = LowBias(x)
  End                           End
  Return(Y);                    Return(Y);
```

Figure 11:
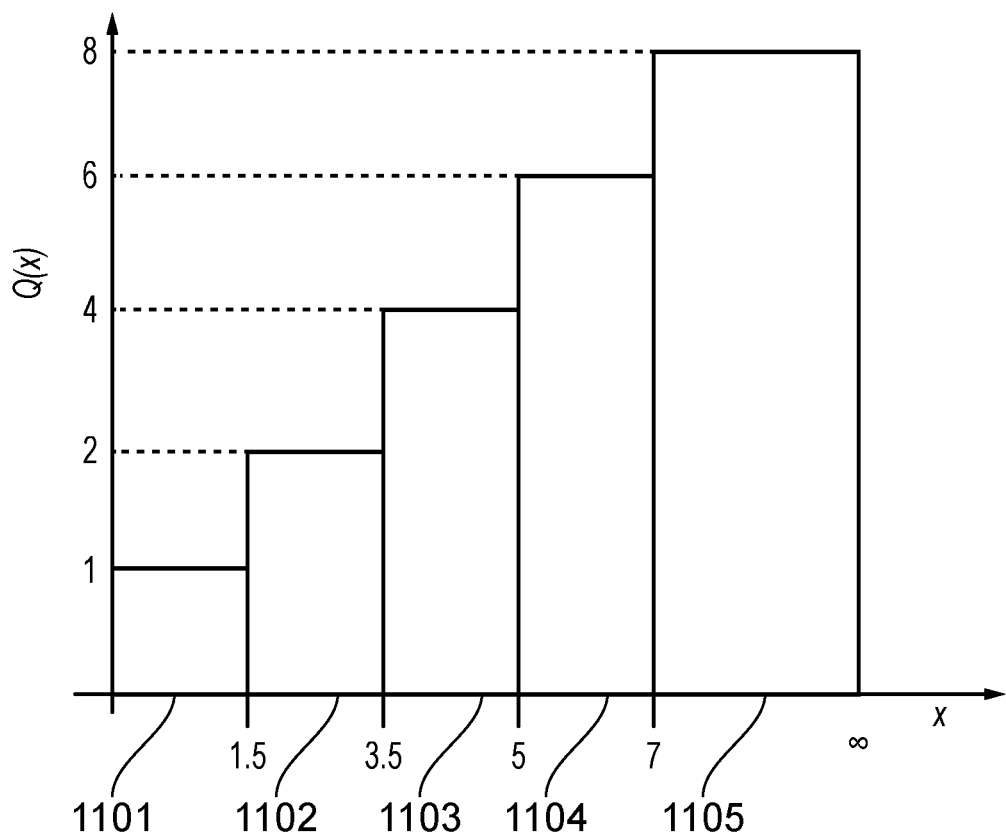
FIG. 11 illustrates the operation of a non-uniform quantizer in the controller circuitry of the transmitting or receiving entity in accordance with embodiments of the present technique.

In another arrangement of embodiments of the present technique, the function Q(.) may be implemented as a traditional non-uniform quantizer as illustrated in FIG. 11. In this arrangement, the argument x of the function has a continuous range from $0 \to \infty$. The output (on the y-axis) only has discrete values from the set $m \in \{1,2,4,6,8\}$ corresponding to the modulation schemes BPSK, QPSK, 16QAM, 64QAM and 256QAM, and the function maps x-values in the ranges marked by the width of the rectangles on the x-axis to the y-axis value designated by the height of the rectangles. That is, all x-values falling in range 1101 are mapped to y=1 (i.e. BPSK is employed as the modulation scheme), all x-values falling in range 1102 are mapped to y=2 (i.e. QPSK is employed as the modulation scheme), all x-values falling in range 1103 are mapped to y=4 (i.e. 16QAM is employed as the modulation scheme), all x-values falling in range 1104 are mapped to y=6 (i.e. 64QAM is employed as the modulation scheme), and all x-values falling in range 1105 are mapped to y=8 (i.e. 256QAM is employed as the modulation scheme). In other words, in this arrangement described with respect to FIG. 11 defining the function Q(.), the quantization operation comprises, for the each of the plurality of time-divided units of the resource allocation and/or the each of the plurality of frequency-divided sub-regions of the resource allocation, the receiving or transmitting entity being configured to determine which of a plurality of ranges of values the maximum number of bits is within, each of the ranges being associated with one of the plurality of modulation schemes, and to select the one of the plurality of modulation schemes associated with the determined one of the plurality of ranges.

Figure 12:
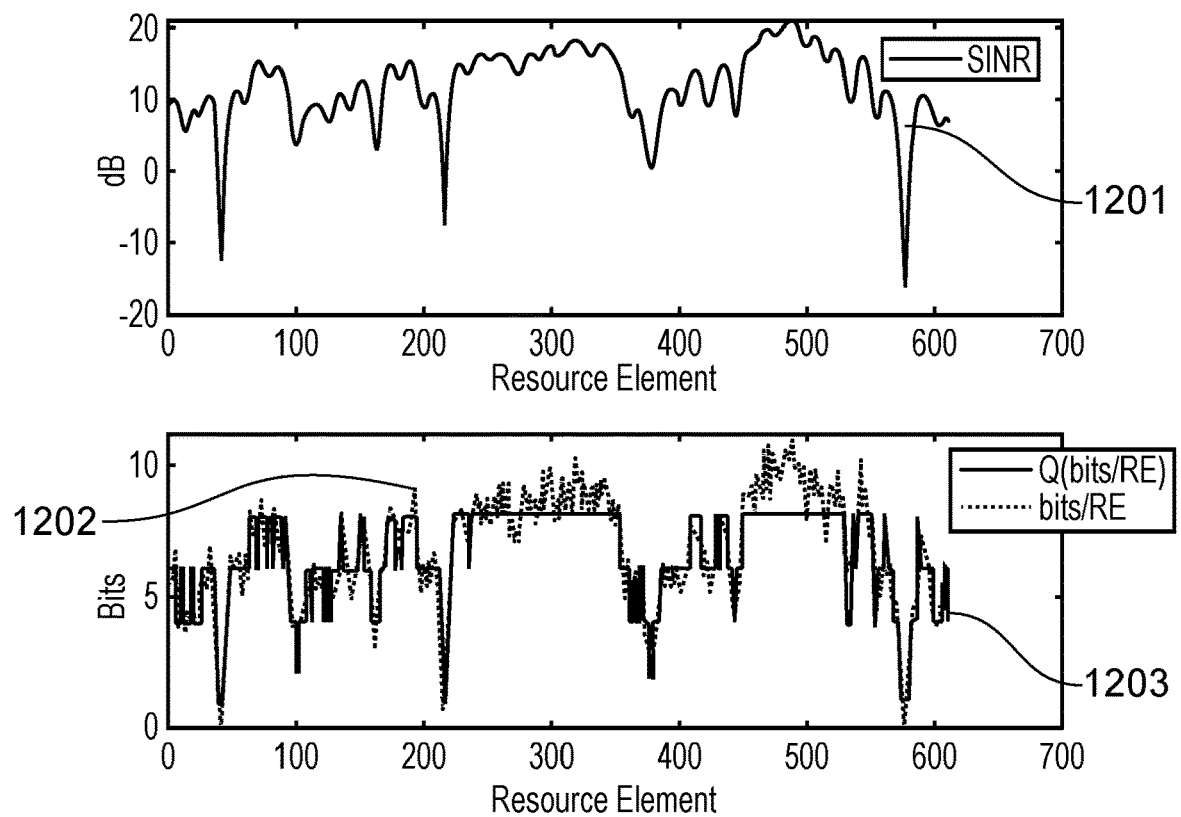
FIG. 12 illustrates a first output resulting from operation of at least some arrangements of embodiments of the present technique.
Figure 13:
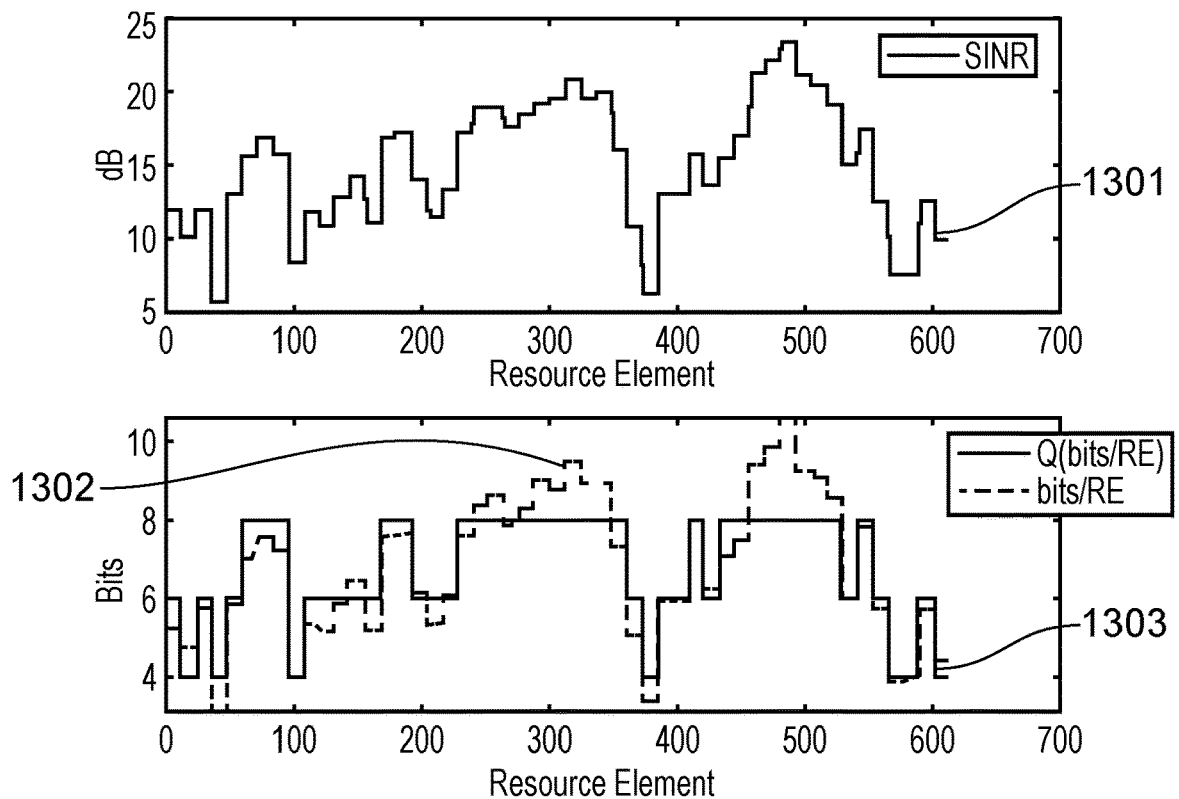
FIG. 13 illustrates a second output resulting from operation of at least some arrangements of embodiments of the present technique.

FIGS. 12 and 13 each show plots of the SINR for TDL-C at 300 ns, illustrating the outputs of the operation of the above-described arrangements of embodiments of the present technique. In FIG. 12, this is shown for the case of the second arrangement as described above, with the SINR being shown by line 1201, followed by the result of calculation of the bits/RE (shown by line 1202) and the result of quantizing this bits/RE values (shown by line 1203). FIG. 13 shows equivalent plots for the case of the third arrangement as described above, with such plots being the SINR (shown by line 1301), the result of calculation of the bits/PRB (shown by line 1302) and the result of quantizing this bits/PRB values (shown by line 1303).

Figure 14:
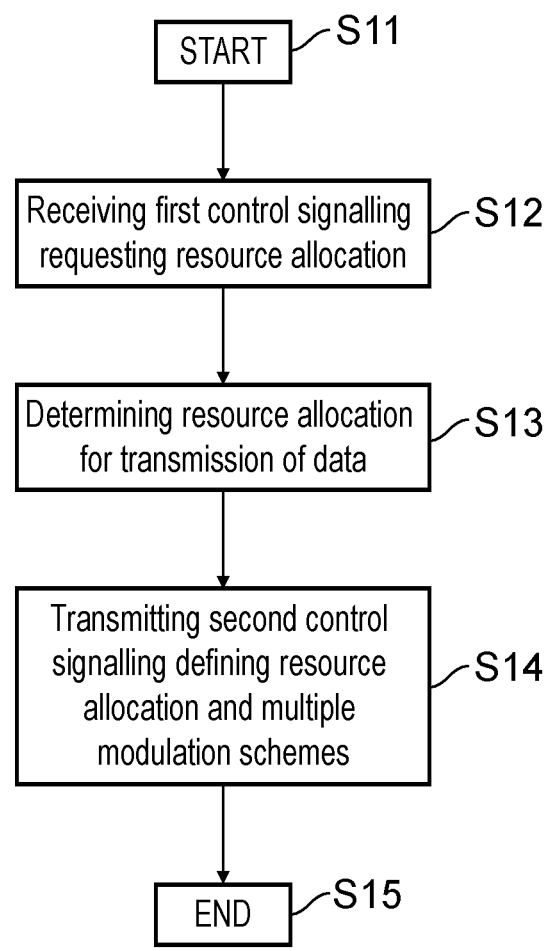
FIG. 14 shows a flow diagram illustrating a second example process of communications in a communications system in accordance with embodiments of the present technique

FIG. 14 shows a flow diagram illustrating a second example process of communications in a communications system in accordance with embodiments of the present technique. The process shown by FIG. 14 is a method of operating a receiving entity forming part of a wireless communications network configured to receive data from a transmitting entity via a communications channel between the receiving entity and the transmitting entity. In the example of FIG. 14, the receiving entity is an infrastructure equipment and the transmitting entity is a communications device, though the skilled person would be aware that embodiments of the present technique may equally apply to scenarios where an infrastructure equipment is a transmitting entity and a communications device is a receiving entity.

The method starts in step S11. In step S12, the method comprises receiving first control signalling from the transmitting entity, the first control signalling requesting a resource allocation within which the transmitting entity is to transmit data to the receiving entity. Such control signalling will often include an indication of the amount of data to be transmitted such as the transmitting entities transmit buffer status. The process then moves to step S13, which comprises determining a resource allocation of the communications channel for the transmitting entity to transmit the data to the receiving entity. Following this, in step S14, the method comprises the receiving entity transmitting second control signalling to the transmitting entity, the second control signalling comprising an indication of the resource allocation. Here, the second control signalling also defines which of a plurality of modulation schemes is to be used by the transmitting entity for each of a plurality of time-divided units of the resource allocation and/or each of a plurality of frequency-divided sub-regions of the resource allocation, wherein the second control signalling defines at least two of the plurality of modulation schemes. The process ends in step S15.

FIGS. 15 to 18 are flow diagrams providing example operation of transmitting entities and receiving entities in accordance with at least some embodiments of the present technique, demonstrating how operation varies depending on which of a communications device and an infrastructure equipment the transmitting entity and the receiving entity are. With reference to steps such as transmitting/receiving reference symbols, estimating channel conditions, determining resources and the like, the skilled person would understand how such steps are carried out, both in terms of the usage of such terminology in the art, and with reference to the arrangements of embodiments of the present technique as described herein.

Figure 15:
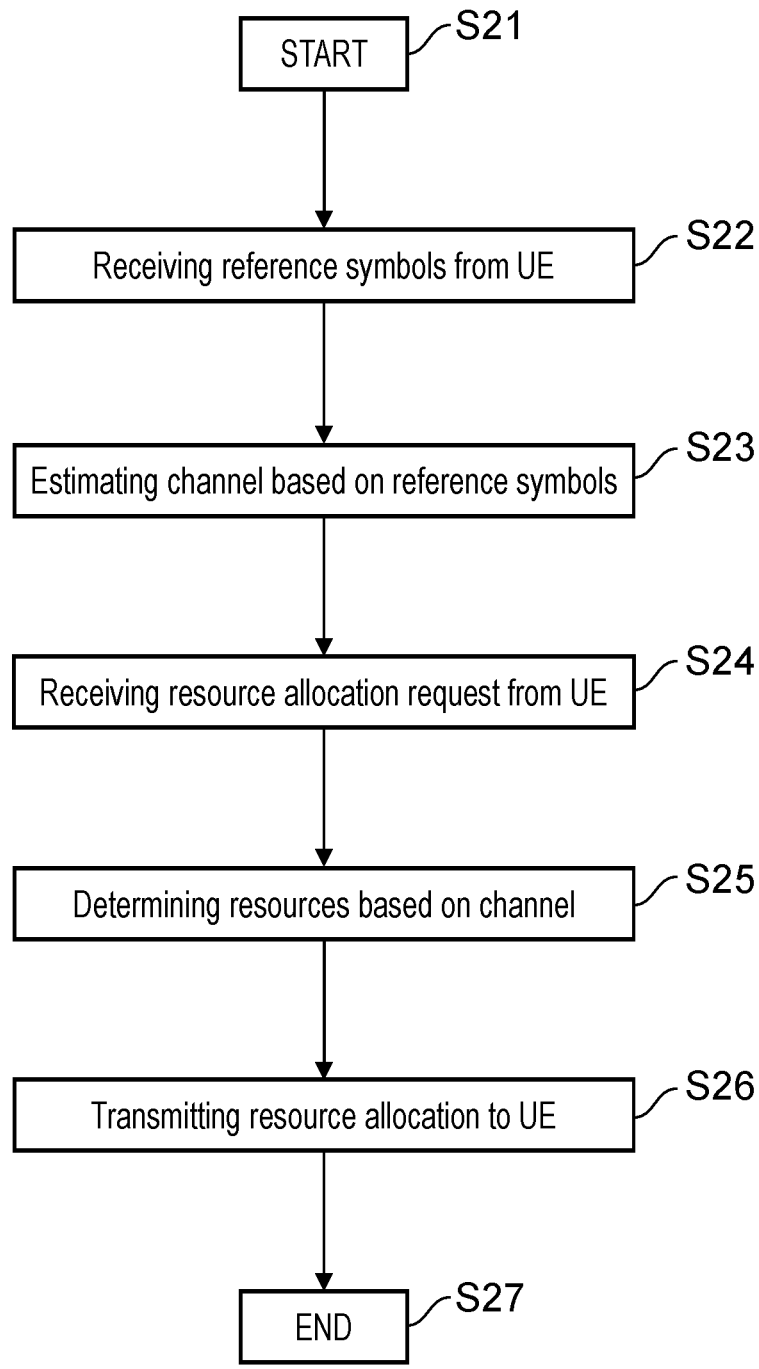
FIG. 15 shows a flow diagram illustrating a third example process of communications in a communications system in which an infrastructure equipment receives data from a communications device in accordance with embodiments of the present technique.

FIG. 15 shows a flow diagram illustrating a third example process of communications in a communications system in which an infrastructure equipment (e.g. an eNodeB) receives data from a communications device (e.g. a UE) in accordance with embodiments of the present technique. FIG. 15 is a method of operating the eNodeB.

The method starts in step S21. In step S22, the method comprises receiving reference symbols from the UE, which the eNodeB then uses, in step S23, to estimate the channel conditions. In step S24, whilst aware of the channel conditions, the eNodeB receives a resource allocation request from the UE (e.g. using UCI), as the UE has data to transmit to the eNodeB. In step S25, the eNodeB determines such a resource allocation based on the channel, with multiple modulation schemes indicated for use over different portions of the resource allocation as has been described in greater detail above. Finally, such a resource allocation is transmitted to the UE (e.g. using DCI) in step S26, before the method ends in step S27.

Figure 16:
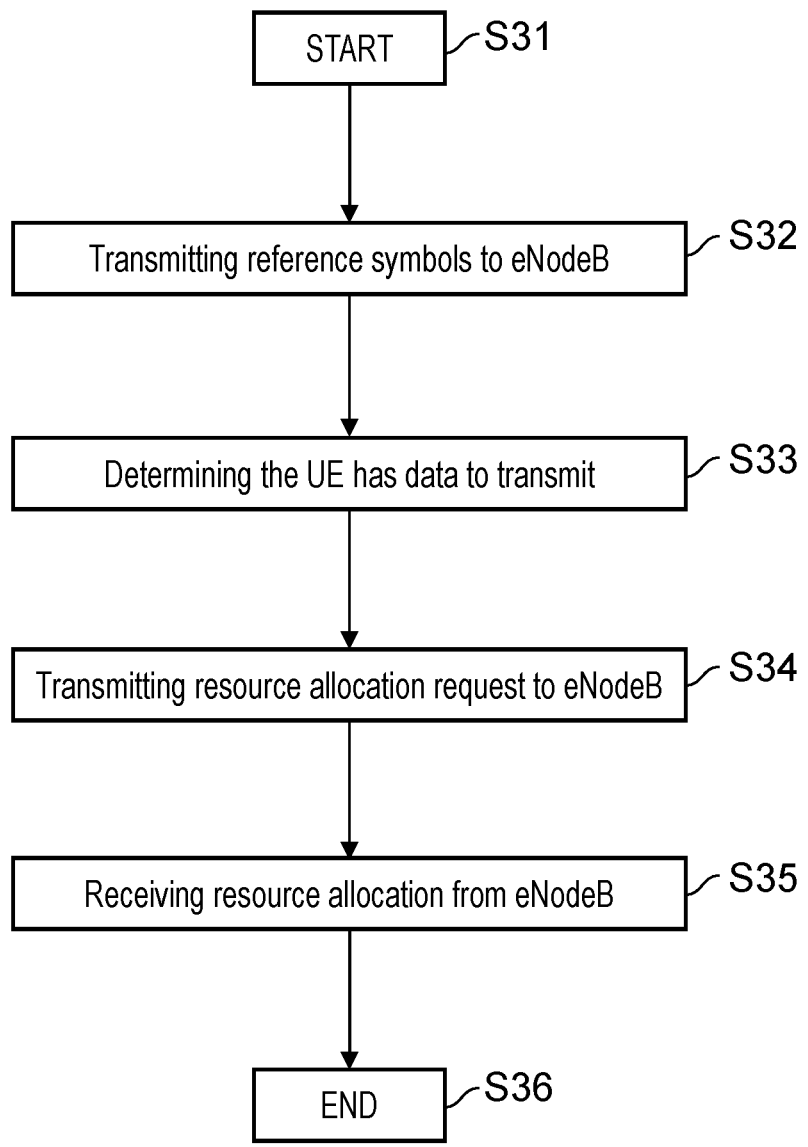
FIG. 16 shows a flow diagram illustrating a fourth example process of communications in a communications system in which a communications device transmits data to an infrastructure equipment in accordance with embodiments of the present technique.

FIG. 16 shows a flow diagram illustrating a fourth example process of communications in a communications system in which a communications device transmits data to an infrastructure equipment in accordance with embodiments of the present technique. FIG. 16 is a method of operating the UE.

The method starts in step S31. In step S32, the method comprises transmitting reference symbols to the eNodeB, which the eNodeB then uses to estimate the channel conditions. In step S33, the UE determines that it has data to transmit to the eNodeB, and in step S34, the UE transmits a resource allocation request to the eNodeB (e.g. using UCI), indicating that the UE has data to transmit to the eNodeB. Based on this resource allocation request, and on the channel conditions estimated based on the transmitted reference symbols, the eNodeB determines a resource allocation for the UE to transmit the data to the eNodeB, with multiple modulation schemes indicated for use over different portions of the resource allocation as has been described in greater detail above. The UE receives (e.g. in DCI), in step S35, an indication of the resource allocation from the eNodeB including the multiple modulation schemes for use over different portions of the resource allocation, before the method ends in step S36.

Figure 17:
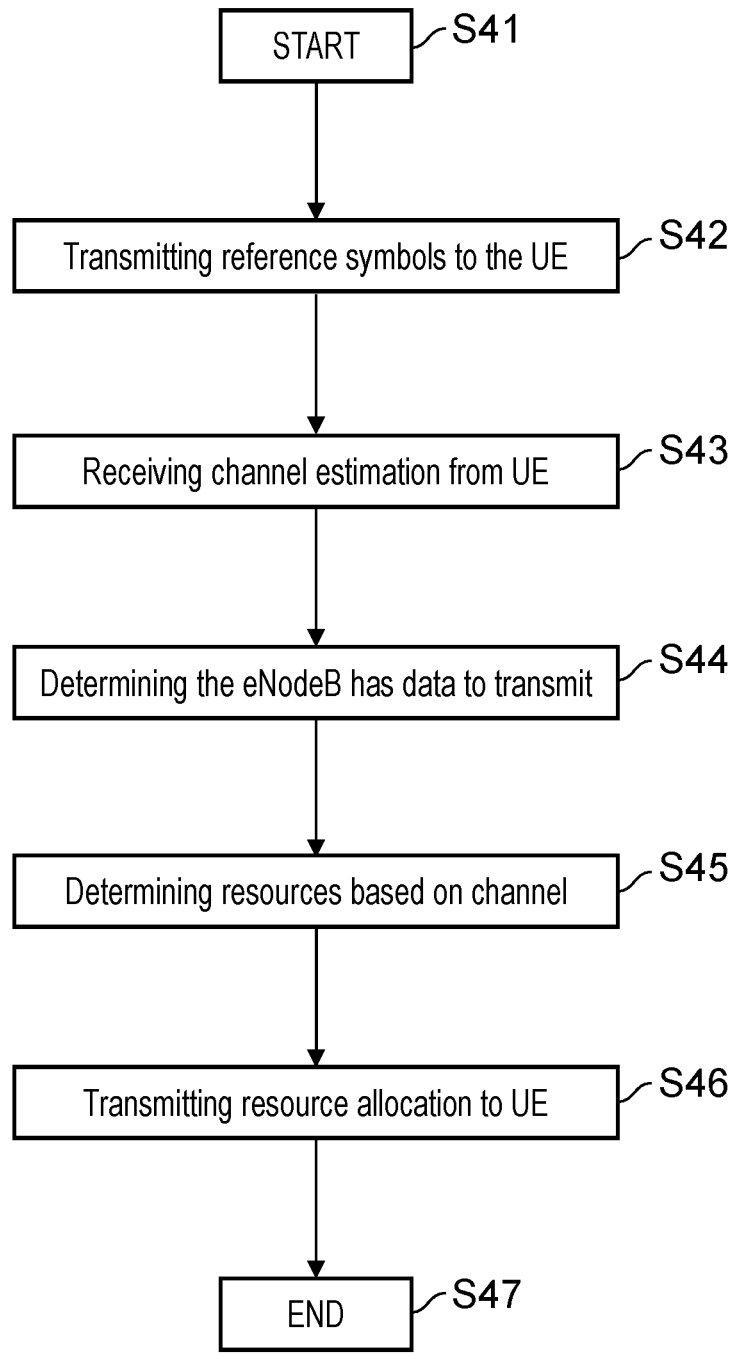
FIG. 17 shows a flow diagram illustrating a fifth example process of communications in a communications system in which an infrastructure equipment transmits data to a communications device in accordance with embodiments of the present technique.

FIG. 17 shows a flow diagram illustrating a fifth example process of communications in a communications system in which an infrastructure equipment transmits data to a communications device in accordance with embodiments of the present technique. FIG. 17 is a method of operating the eNodeB.

The method starts in step S41. In step S42, the method comprises transmitting reference symbols to the UE, which the UE then uses to estimate the channel conditions. In step S43, the eNodeB receives a channel measurement report from the UE based on the transmitted reference symbols. In step S44, whilst aware of the channel conditions, the eNodeB determines that it has data to transmit to the UE. In step S45, the eNodeB determines a resource allocation in which to transmit the data based on the channel, with multiple modulation schemes indicated for use over different portions of the resource allocation as has been described in greater detail above. Finally, such a resource allocation is transmitted to the UE (e.g. using DCI) to tell the UE that it will receive data (using that resource allocation) from the eNodeB in step S46, before the method ends in step S47.

Figure 18:
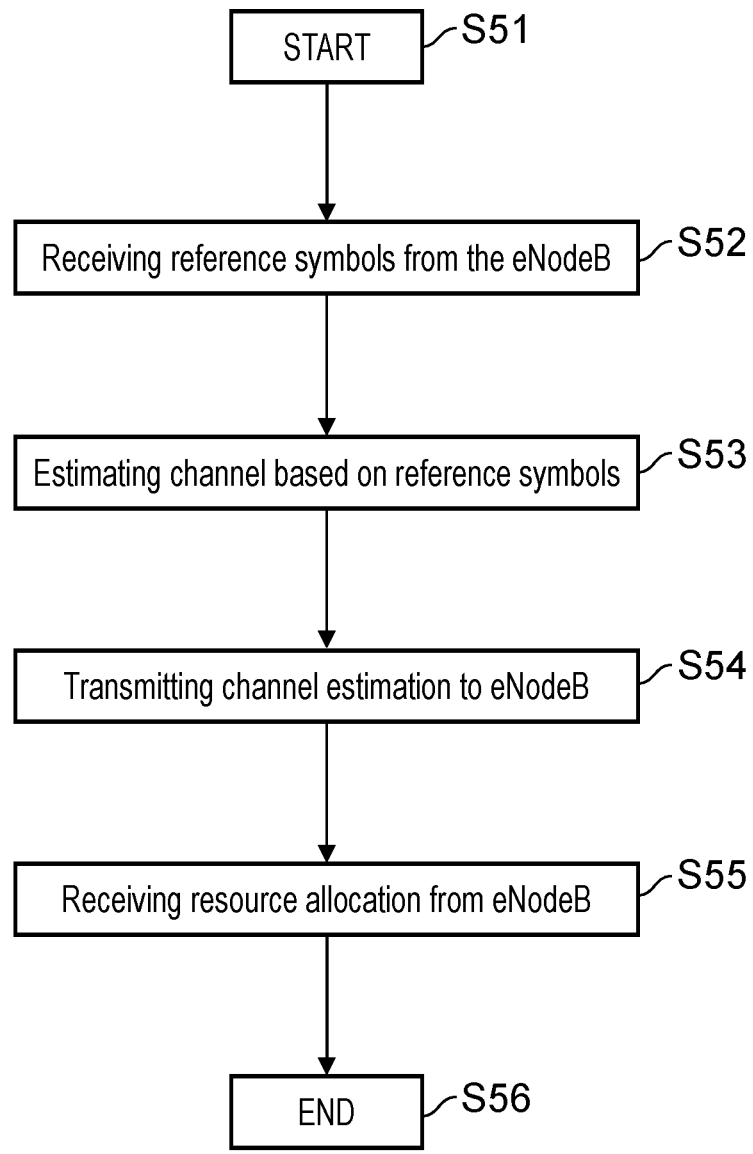
FIG. 18 shows a flow diagram illustrating a sixth example process of communications in a communications system in which a communications device receives data from an infrastructure equipment in accordance with embodiments of the present technique.

FIG. 18 shows a flow diagram illustrating a sixth example process of communications in a communications system in which a communications device receives data from an infrastructure equipment in accordance with embodiments of the present technique. FIG. 18 is a method of operating the UE.

The method starts in step S51. In step S52, the method comprises receiving reference symbols from the eNodeB, which the UE then uses, in step S53, to estimate the channel conditions. Such channel conditions are then transmitted by the UE to the eNodeB (for example in CQI) in step S54. Then, in step S55, the UE receives an indication of a resource allocation from the eNodeB (e.g. using DCI), to tell the UE that it will receive data (using that resource allocation) from the eNodeB. Here, the resource allocation is determined by the eNodeB based on the channel conditions indicated by the UE to the eNodeB in step S54, and comprises multiple modulation schemes indicated for use over different portions of the resource allocation as has been described in greater detail above. The method ends in step S56.

As described above and herein, the transmitting entity may be one of a communications device (i.e. UE) and a network infrastructure equipment (i.e. BS/eNB/gNB), and the receiving entity may be the other of the communications device (i.e. UE) and the network infrastructure equipment (i.e. BS/eNB/gNB).

Those skilled in the art would appreciate that the methods shown by FIGS. 10 and 14 may be adapted in accordance with embodiments of the present technique. For example, other preliminary, intermediate, or subsequent steps as described herein may be included in the method, or the steps may be performed in any logical order. Though embodiments of the present technique have been described largely by way of the example communications system shown by FIG. 8, and described with respect to FIGS. 8 to 14, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. An infrastructure equipment forming part of a wireless communications network configured to receive data from a communications device via a communications channel between the infrastructure equipment and the communications device, comprising transceiver circuitry to transmit signals to and to receive signals from the communications device, and controller circuitry configured in combination with the transceiver circuitry to receive first control signalling from the communications device, the first control signalling requesting a resource allocation within which the communications device is to transmit data to the infrastructure equipment, to determine a resource allocation of the communications channel for the communications device to transmit the data to the infrastructure equipment, and to transmit second control signalling to the communications device, the second control signalling comprising an indication of the resource allocation, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Paragraph 2. An infrastructure equipment according to Paragraph 1, wherein the determining the resource allocation comprises the infrastructure equipment being configured to estimate, for each of the plurality of time-divided units of the resource allocation and/or each of the plurality of frequency-divided sub-regions of the resource allocation, values of one or more channel attributes of the communications channel.

Paragraph 3. An infrastructure equipment according to Paragraph 2, configured
to receive one or more reference symbols from the communications device,
wherein the estimating the values of the one or more channel attributes of the communications channel is based on the received reference symbols.

Paragraph 4. An infrastructure equipment according to Paragraph 2 or Paragraph 3, wherein the modulation scheme that is to be used by the communications device for each of the plurality of time-divided units of the resource allocation and/or each of the plurality of frequency-divided sub-regions of the resource allocation depends on the values of the one or more channel attributes for the each of the plurality of time-divided units of the resource allocation and/or the each of the plurality of frequency-divided sub-regions of the resource allocation.

Paragraph 5. An infrastructure equipment according to any of Paragraphs 2 to 4, configured
to determine, based on the values of the one or more channel attributes of the communications channel, a maximum number of bits that can be carried by each of the plurality of time-divided units of the resource allocation and/or each of the plurality of frequency-divided sub-regions of the resource allocation.

Paragraph 6. An infrastructure equipment according to Paragraph 5, configured
to perform a quantization operation on the maximum number of bits for each of the plurality of time-divided units of the resource allocation and/or each of the plurality of frequency-divided sub-regions of the resource allocation.

Paragraph 7. An infrastructure equipment according to Paragraph 6, wherein the quantization operation comprises, for the each of the plurality of time-divided units of the resource allocation and/or the each of the plurality of frequency-divided sub-regions of the resource allocation, the infrastructure equipment being configured
to round the maximum number of bits to a closest one of a plurality of values each associated with one of the plurality of modulation schemes, and
to select the one of the plurality of modulation schemes associated with the rounded maximum number of bits.

Paragraph 8. An infrastructure equipment according to Paragraph 6 or Paragraph 7, wherein the quantization operation comprises, for the each of the plurality of time-divided units of the resource allocation and/or the each of the plurality of frequency-divided sub-regions of the resource allocation, the infrastructure equipment being configured
to determine which of a plurality of ranges of values the maximum number of bits is within, each of the ranges being associated with one of the plurality of modulation schemes, and
to select the one of the plurality of modulation schemes associated with the determined one of the plurality of ranges.

Paragraph 9. An infrastructure equipment according to any of Paragraphs 1 to 8, wherein the second control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs, the time-divided units of the resource allocation each being one OFDM symbol.

Paragraph 10. An infrastructure equipment according to any of Paragraphs 1 to 9, wherein the second control signalling defines which of the plurality of modulation schemes is to be used for each of the plurality of frequency-divided sub-regions of the resource allocation for an entire duration of the resource allocation, the frequency divided sub-regions of the resource allocation being resource elements, REs.

Paragraph 11. An infrastructure equipment according to any of Paragraphs 1 to 10, wherein the second control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

Paragraph 12. An infrastructure equipment according to any of Paragraphs 1 to 11, wherein one or both of the modulation scheme that is to be used by the communications device for each of the plurality of time-divided units of the resource allocation and/or each of the plurality of frequency-divided sub-regions of the resource allocation and a size of the plurality of time-divided units of the resource allocation and/or each of the plurality of frequency-divided sub-regions of the resource allocation depends on a mobility of the communications device.

Paragraph 13. An infrastructure equipment according to any of Paragraphs 1 to 12, wherein the plurality of modulation schemes comprise square modulation schemes.

Paragraph 14. An infrastructure equipment according to Paragraph 13, wherein the plurality of modulation schemes comprise one or more of BPSK, QPSK, 16QAM, 64QAM and 256QAM.

Paragraph 15. An infrastructure equipment according to any of Paragraphs 1 to 14, wherein the plurality of modulation schemes comprise non-square modulation schemes.

Paragraph 16. An infrastructure equipment according to Paragraph 15, wherein the plurality of modulation schemes comprise one or more of 8-PSK, 32-APSK, 128-APSK, 512-APSK.

Paragraph 17. A method of operating an infrastructure equipment forming part of a wireless communications network configured to receive data from a communications device via a communications channel between the infrastructure equipment and the communications device, the method comprising
receiving first control signalling from the communications device, the first control signalling requesting a resource allocation within which the communications device is to transmit data to the infrastructure equipment,
determining a resource allocation of the communications channel for the communications device to transmit the data to the infrastructure equipment, and
transmitting second control signalling to the communications device, the second control signalling comprising an indication of the resource allocation, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Paragraph 18. Circuitry for an infrastructure equipment forming part of a wireless communications network configured to receive data from a communications device via a communications channel between the circuitry and the communications device, the circuitry comprising transceiver circuitry to transmit signals to and to receive signals from the communications device, and controller circuitry configured in combination with the transceiver circuitry to receive first control signalling from the communications device, the first control signalling requesting a resource allocation within which the communications device is to transmit data to the circuitry, to determine a resource allocation of the communications channel for the communications device to transmit the data to the circuitry, and to transmit second control signalling to the communications device, the second control signalling comprising an indication of the resource allocation, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Paragraph 19. A communications device forming part of a wireless communications network configured to transmit data to an infrastructure equipment via a communications channel between the communications device and the infrastructure equipment, comprising transceiver circuitry to transmit signals to and to receive signals from the infrastructure equipment, and controller circuitry configured in combination with the transceiver circuitry to determine that the communications device has data to transmit to the infrastructure equipment, to transmit first control signalling to the infrastructure equipment, the first control signalling requesting a resource allocation within which the communications device is to transmit the data to the infrastructure equipment, and to receive second control signalling from the infrastructure equipment, the second control signalling comprising an indication of a resource allocation of the communications channel for the communications device to transmit the data to the infrastructure equipment, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Paragraph 20. A communications device according to Paragraph 19, configured to transmit one or more reference symbols to the infrastructure equipment, wherein the one or more reference symbols are to be used by the infrastructure equipment for estimating values of one or more channel attributes of the communications channel.

Paragraph 21. A communications device according to Paragraph 20, wherein the modulation scheme that is to be used by the communications device for each of the plurality of time-divided units of the resource allocation and/or each of the plurality of frequency-divided sub-regions of the resource allocation depends on the values of the one or more channel attributes for the each of the plurality of time-divided units of the resource allocation and/or the each of the plurality of frequency-divided sub-regions of the resource allocation.

Paragraph 22. A communications device according to any of Paragraphs 19 to 21, wherein the second control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs, the time-divided units of the resource allocation each being an OFDM symbol.

Paragraph 23. A communications device according to any of Paragraphs 19 to 22, wherein the second control signalling defines which of the plurality of modulation schemes is to be used for each of the plurality of frequency-divided sub-regions of the resource allocation for an entire duration of the resource allocation, the frequency divided sub-regions of the resource allocation being resource elements, REs.

Paragraph 24. A communications device according to any of Paragraphs 19 to 23, wherein the second control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

Paragraph 25. A communications device according to any of Paragraphs 19 to 24, wherein at least one of the modulation scheme that is to be used by the communications device for each of the plurality of time-divided units of the resource allocation and/or each of the plurality of frequency-divided sub-regions of the resource allocation and a size of the plurality of time-divided units of the resource allocation and/or each of the plurality of frequency-divided sub-regions of the resource allocation depends on a mobility of the communications device.

Paragraph 26. A communications device according to any of Paragraphs 19 to 25, wherein the plurality of modulation schemes comprise square modulation schemes.

Paragraph 27. A communications device according to Paragraph 26, wherein the plurality of modulation schemes comprise one or more of BPSK, QPSK, 16QAM, 64QAM and 256QAM.

Paragraph 28. A communications device according to any of Paragraphs 19 to 27, wherein the plurality of modulation schemes comprise non-square modulation schemes.

Paragraph 29. A communications device according to Paragraph 28, wherein the plurality of modulation schemes comprise one or more of 8-PSK, 32-APSK, 128-APSK, 512-APSK.

Paragraph 30. A method of operating a communications device forming part of a wireless communications network configured to transmit data to an infrastructure equipment via a communications channel between the communications device and the infrastructure equipment, the method comprising determining that the communications device has data to transmit to the infrastructure equipment, transmitting first control signalling to the infrastructure equipment, the first control signalling requesting a resource allocation within which the communications device is to transmit the data to the infrastructure equipment, and receiving second control signalling from the infrastructure equipment, the second control signalling comprising an indication of a resource allocation of the communications channel for the communications device to transmit the data to the infrastructure equipment, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

Paragraph 31. Circuitry for a communications device forming part of a wireless communications network configured to transmit data to an infrastructure equipment via a communications channel between the circuitry and the infrastructure equipment, the circuitry comprising transceiver circuitry to transmit signals to and to receive signals from the infrastructure equipment, and controller circuitry configured in combination with the transceiver circuitry to determine that the circuitry has data to transmit to the infrastructure equipment, to transmit first control signalling to the infrastructure equipment, the first control signalling requesting a resource allocation within which the circuitry is to transmit the data to the infrastructure equipment, and to receive second control signalling from the infrastructure equipment, the second control signalling comprising an indication of a resource allocation of the communications channel for the circuitry to transmit the data to the infrastructure equipment, wherein the second control signalling defines which of a plurality of modulation schemes is to be used by the circuitry for each of a plurality of time-divided units of the resource allocation and/or each of a plurality of frequency-divided sub-regions of the resource allocation, wherein the second control signalling defines at least two of the plurality of modulation schemes.

Paragraph 32. An infrastructure equipment forming part of a wireless communications network configured to transmit data to a communications device via a communications channel between the infrastructure equipment and the communications device, comprising transceiver circuitry to transmit signals to and to receive signals from the communications device, and controller circuitry configured in combination with the transceiver circuitry to determine that the infrastructure equipment has data to transmit to the communications device, to determine a resource allocation of the communications channel for the infrastructure equipment to transmit the data to the communications device, and to transmit first control signalling to the communications device, the first control signalling comprising an indication of the resource allocation, wherein the first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

Paragraph 33. An infrastructure equipment according to Paragraph 32, configured to transmit one or more reference symbols to the communications device, wherein the one or more reference symbols are to be used by the communications device for estimating values of one or more channel attributes of the communications channel, the estimated values being used by the communications device to determine the which of the plurality of modulation schemes that is to be used by the infrastructure equipment for each of the plurality of time-divided units of the resource allocation and/or each of the plurality of frequency-divided sub-regions of the resource allocation.

Paragraph 34. An infrastructure equipment according to Paragraph 33, configured to receive second control signalling from the communications device in advance of transmitting the first control signalling, the second control signalling indicating, for each of the plurality of time-divided units of the resource allocation and/or each of the plurality of frequency-divided sub-regions of the resource allocation, the which of the plurality of modulation schemes that is to be used by the infrastructure equipment.

Paragraph 35. An infrastructure equipment according to Paragraph 34, wherein the modulation scheme that is to be used by the infrastructure equipment for each of the plurality of time-divided units of the resource allocation and/or each of the plurality of frequency-divided sub-regions of the resource allocation depends on the estimated values of the one or more channel attributes for the each of the plurality of time-divided units of the resource allocation and/or the each of the plurality of frequency-divided sub-regions of the resource allocation determined by the communications device.

Paragraph 36. An infrastructure equipment according to any of Paragraphs 32 to 35, wherein the first control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs, the time-divided units of the resource allocation each being an OFDM symbol.

Paragraph 37. An infrastructure equipment according to any of Paragraphs 32 to 36, wherein the first control signalling defines which of the plurality of modulation schemes is to be used for each of the plurality of frequency-divided sub-regions of the resource allocation for an entire duration of the resource allocation, the frequency divided sub-regions of the resource allocation being resource elements, REs.

Paragraph 38. An infrastructure equipment according to any of Paragraphs 32 to 37, wherein the first control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

Paragraph 39. An infrastructure equipment according to any of Paragraphs 32 to 38, wherein at least one of the modulation scheme that is to be used by the infrastructure equipment for each of the plurality of time-divided units of the resource allocation and/or each of the plurality of frequency-divided sub-regions of the resource allocation and a size of the plurality of time-divided units of the resource allocation and/or each of the plurality of frequency-divided sub-regions of the resource allocation depends on a mobility of the communications.

Paragraph 40. An infrastructure equipment according to any of Paragraphs 32 to 39, wherein the plurality of modulation schemes comprise square modulation schemes.

Paragraph 41. An infrastructure equipment according to Paragraph 40, wherein the plurality of modulation schemes comprise one or more of BPSK, QPSK, 16QAM, 64QAM and 256QAM.

Paragraph 42. An infrastructure equipment according to any of Paragraphs 32 to 41, wherein the plurality of modulation schemes comprise non-square modulation schemes.

Paragraph 43. An infrastructure equipment according to Paragraph 42, wherein the plurality of modulation schemes comprise one or more of 8-PSK, 32-APSK, 128-APSK, 512-APSK.

Paragraph 44. A method of operating an infrastructure equipment forming part of a wireless communications network configured to transmit data to a communications device via a communications channel between the infrastructure equipment and the communications device, the method comprising determining that the infrastructure equipment has data to transmit to the communications device, determining a resource allocation of the communications channel for the infrastructure equipment to transmit the data to the communications device, and transmitting first control signalling to the communications device, the control signalling comprising an indication of the resource allocation, wherein the first control signalling defines which of a plurality of modulation schemes is to be used by the infrastructure equipment for each of a plurality of time-divided units of the resource allocation and/or each of a plurality of frequency-divided sub-regions of the resource allocation, wherein the second control signalling defines at least two of the plurality of modulation schemes.

Paragraph 45. Circuitry for an infrastructure equipment forming part of a wireless communications network configured to transmit data to a communications device via a communications channel between the infrastructure equipment and the communications device, comprising transceiver circuitry to transmit signals to and to receive signals from the communications device, and controller circuitry configured in combination with the transceiver circuitry to determine that the circuitry has data to transmit to the communications device, to determine a resource allocation of the communications channel for the circuitry to transmit the data to the communications device, and to transmit first control signalling to the communications device, the control signalling comprising an indication of the resource allocation, wherein the first control signalling defines which of a plurality of modulation schemes is to be used by the circuitry for each of a plurality of time-divided units of the resource allocation and/or each of a plurality of frequency-divided sub-regions of the resource allocation, wherein the second control signalling defines at least two of the plurality of modulation schemes.

Paragraph 46. A communications device forming part of a wireless communications network configured to receive data from an infrastructure equipment via a communications channel between the communications device and the infrastructure equipment, comprising transceiver circuitry to transmit signals to and to receive signals from the infrastructure equipment, and controller circuitry configured in combination with the transceiver circuitry to receive first control signalling from the infrastructure equipment, the first control signalling comprising an indication of a resource allocation of the communications channel in which the communications device is to receive data from the infrastructure equipment, wherein the first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

Paragraph 47. A communications device according to Paragraph 46, configured to receive one or more reference symbols from the infrastructure equipment.

Paragraph 48. A communications device according to Paragraph 47, configured to estimate, based on the received reference symbols, values of one or more channel attributes of the communications channel, and to determine, based on the estimated values of the one or more channel attributes of the communications channel, the which of the plurality of modulation schemes that is to be used by the infrastructure equipment for each of the plurality of time-divided units of the resource allocation and/or each of the plurality of frequency-divided sub-regions of the resource allocation.

Paragraph 49. A communications device according to Paragraph 48, configured to transmit, to the infrastructure equipment in advance of receiving the first control signalling, second control signalling indicating, for each of the plurality of time-divided units of the resource allocation and/or each of the plurality of frequency-divided sub-regions of the resource allocation, the which of the plurality of modulation schemes that is to be used by the infrastructure equipment.

Paragraph 50. A communications device according to Paragraph 49, wherein the modulation scheme that is to be used by the infrastructure equipment for each of the plurality of time-divided units of the resource allocation and/or each of the plurality of frequency-divided sub-regions of the resource allocation depends on the transmitted second control signalling.

Paragraph 51. A communications device according to any of Paragraphs 46 to 50, wherein the first control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs, the time-divided units of the resource allocation each being an OFDM symbol.

Paragraph 52. A communications device according to any of Paragraphs 46 to 51, wherein the first control signalling defines which of the plurality of modulation schemes is to be used for each of the plurality of frequency-divided sub-regions of the resource allocation for an entire duration of the resource allocation, the frequency divided sub-regions of the resource allocation being resource elements, REs.

Paragraph 53. A communications device according to any of Paragraphs 46 to 52, wherein the first control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

Paragraph 54. A communications device according to any of Paragraphs 46 to 53, wherein at least one of the modulation scheme that is to be used by the infrastructure equipment for each of the plurality of time-divided units of the resource allocation and/or each of the plurality of frequency-divided sub-regions of the resource allocation and a size of the plurality of time-divided units of the resource allocation and/or each of the plurality of frequency-divided sub-regions of the resource allocation depends on a mobility of the communications device.

Paragraph 55. A communications device according to any of Paragraphs 46 to 54, wherein the plurality of modulation schemes comprise square modulation schemes.

Paragraph 56. A communications device according to Paragraph 55, wherein the plurality of modulation schemes comprise one or more of BPSK, QPSK, 16QAM, 64QAM and 256QAM.

Paragraph 57. A communications device according to any of Paragraphs 46 to 56, wherein the plurality of modulation schemes comprise non-square modulation schemes.

Paragraph 58. A communications device according to Paragraph 57, wherein the plurality of modulation schemes comprise one or more of 8-PSK, 32-APSK, 128-APSK, 512-APSK.

Paragraph 59. A method of operating a communications device forming part of a wireless communications network configured to receive data from an infrastructure equipment via a communications channel between the communications device and the infrastructure equipment, the method comprising
receiving first control signalling from the infrastructure equipment, the first control signalling comprising an indication of a resource allocation of the communications channel in which the communications device is to receive data from the infrastructure equipment,
wherein the first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

Paragraph 60. Circuitry for a communications device forming part of a wireless communications network configured to receive data from an infrastructure equipment via a communications channel between the communications device and the infrastructure equipment, comprising
transceiver circuitry to transmit signals to and to receive signals from the infrastructure equipment, and
controller circuitry configured in combination with the transceiver circuitry
to receive first control signalling from the infrastructure equipment, the first control signalling comprising an indication of a resource allocation of the communications channel in which the circuitry is to receive data from the infrastructure equipment,
wherein the first control signalling defines which of a plurality of modulation schemes is to be used by the infrastructure equipment for each of a plurality of time-divided units of the resource allocation and/or each of a plurality of frequency-divided sub-regions of the resource allocation, wherein the first control signalling defines at least two of the plurality of modulation schemes.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 38.300 v. 15.2.0 "NR; NR and NG-RAN Overall Description; Stage 2 (Release 15)", June 2018.

[2] Holma H. and Toskala A, "LTE for UMTS OFDMA and SC-FDMA based radio access", John Wiley and Sons, 2009.

[3] European Patent Application No. EP19209541.2.

What is claimed is:

1. An infrastructure equipment forming part of a wireless communications network configured to receive data from a communications device via a communications channel between the infrastructure equipment and the communications device, comprising
transceiver circuitry to transmit signals to and to receive signals from the communications device, and
controller circuitry configured in combination with the transceiver circuitry
to receive first control signalling from the communications device, the first control signalling requesting a resource allocation within which the communications device is to transmit data to the infrastructure equipment,
to determine a resource allocation of the communications channel for the communications device to transmit the data to the infrastructure equipment, and
to transmit second control signalling to the communications device, the second control signalling comprising an indication of the resource allocation,
wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

2. An infrastructure equipment according to claim 1, wherein the determining the resource allocation comprises the infrastructure equipment being configured
to estimate, for each of the plurality of time-divided units of the resource allocation and/or each of the plurality of frequency-divided sub-regions of the resource allocation, values of one or more channel attributes of the communications channel.

3. An infrastructure equipment according to claim 2, configured
to receive one or more reference symbols from the communications device,
wherein the estimating the values of the one or more channel attributes of the communications channel is based on the received reference symbols.

4. An infrastructure equipment according to claim 2, wherein the modulation scheme that is to be used by the communications device for each of the plurality of time-divided units of the resource allocation and/or each of the plurality of frequency-divided sub-regions of the resource allocation depends on the values of the one or more channel attributes for the each of the plurality of time-divided units of the resource allocation and/or the each of the plurality of frequency-divided sub-regions of the resource allocation.

5. An infrastructure equipment according to claim 2, configured
to determine, based on the values of the one or more channel attributes of the communications channel, a maximum number of bits that can be carried by each of the plurality of time-divided units of the resource allocation and/or each of the plurality of frequency-divided sub-regions of the resource allocation.

6. An infrastructure equipment according to claim 5, configured
to perform a quantization operation on the maximum number of bits for each of the plurality of time-divided units of the resource allocation and/or each of the plurality of frequency-divided sub-regions of the resource allocation.

7. An infrastructure equipment according to claim 6, wherein the quantization operation comprises, for the each of the plurality of time-divided units of the resource allocation and/or the each of the plurality of frequency-divided sub-regions of the resource allocation, the infrastructure equipment being configured
to round the maximum number of bits to a closest one of a plurality of values each associated with one of the plurality of modulation schemes, and
to select the one of the plurality of modulation schemes associated with the rounded maximum number of bits.

8. An infrastructure equipment according to claim 6, wherein the quantization operation comprises, for the each of the plurality of time-divided units of the resource allocation and/or the each of the plurality of frequency-divided sub-regions of the resource allocation, the infrastructure equipment being configured
to determine which of a plurality of ranges of values the maximum number of bits is within, each of the ranges being associated with one of the plurality of modulation schemes, and
to select the one of the plurality of modulation schemes associated with the determined one of the plurality of ranges.

9. An infrastructure equipment according to claim 1, wherein the second control signalling defines which of the plurality of modulation schemes is to be used for each of the plurality of frequency-divided sub-regions of the resource allocation and for each of the time-divided units of the resource allocation, the frequency divided sub-regions of the resource allocation being physical resource blocks, PRBs, the time-divided units of the resource allocation each being one OFDM symbol.

10. An infrastructure equipment according to claim 1, wherein the second control signalling defines which of the plurality of modulation schemes is to be used for each of the plurality of frequency-divided sub-regions of the resource allocation for an entire duration of the resource allocation, the frequency divided sub-regions of the resource allocation being resource elements, REs.

11. An infrastructure equipment according to claim 1, wherein the second control signalling defines which of the plurality of modulation schemes is to be used for each of the plurality of frequency-divided sub-regions of the resource allocation for an entire duration of the resource allocation, the frequency divided sub-regions of the resource allocation being physical resource blocks, PRBs.

12. An infrastructure equipment according to claim 1, wherein one or both of the modulation scheme that is to be used by the communications device for each of the plurality of time-divided units of the resource allocation and/or each of the plurality of frequency-divided sub-regions of the resource allocation and a size of the plurality of time-divided units of the resource allocation and/or each of the plurality of frequency-divided sub-regions of the resource allocation depends on a mobility of the communications device.

13. An infrastructure equipment according to claim 1, wherein the plurality of modulation schemes comprise square modulation schemes.

14. An infrastructure equipment according to claim 13, wherein the plurality of modulation schemes comprise one or more of BPSK, QPSK, 16QAM, 64QAM and 256QAM.

15. An infrastructure equipment according to claim 1, wherein the plurality of modulation schemes comprise non-square modulation schemes.

16. An infrastructure equipment according to claim 15, wherein the plurality of modulation schemes comprise one or more of 8-PSK, 32-APSK, 128-APSK, 512-APSK.

17. A method of operating an infrastructure equipment forming part of a wireless communications network configured to receive data from a communications device via a communications channel between the infrastructure equipment and the communications device, the method comprising receiving first control signalling from the communications device, the first control signalling requesting a resource allocation within which the communications device is to transmit data to the infrastructure equipment, determining a resource allocation of the communications channel for the communications device to transmit the data to the infrastructure equipment, and transmitting second control signalling to the communications device, the second control signalling comprising an indication of the resource allocation, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

18. A method of operating a communications device forming part of a wireless communications network configured to transmit data to an infrastructure equipment via a communications channel between the communications device and the infrastructure equipment, the method comprising determining that the communications device has data to transmit to the infrastructure equipment, transmitting first control signalling to the infrastructure equipment, the first control signalling requesting a resource allocation within which the communications device is to transmit the data to the infrastructure equipment, and receiving second control signalling from the infrastructure equipment, the second control signalling comprising an indication of a resource allocation of the communications channel for the communications device to transmit the data to the infrastructure equipment, wherein the second control signalling defines which of a plurality of modulation schemes is to be used by the communications device for each of a plurality of time-divided units of the resource allocation and/or each of a plurality of frequency-divided sub-regions of the resource allocation, wherein the second control signalling defines at least two of the plurality of modulation schemes.

* * * * *